United States Patent
Alameh et al.

(10) Patent No.: US 11,605,242 B2
(45) Date of Patent: Mar. 14, 2023

(54) METHODS AND DEVICES FOR IDENTIFYING MULTIPLE PERSONS WITHIN AN ENVIRONMENT OF AN ELECTRONIC DEVICE

(71) Applicant: Motorola Mobility LLC, Chicago, IL (US)

(72) Inventors: Rachid Alameh, Crystal Lake, IL (US); Amitkumar Balar, Mundelein, IL (US); Thomas Merrell, Beach Park, IL (US); Jarrett Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 352 days.

(21) Appl. No.: 16/002,894

(22) Filed: Jun. 7, 2018

(65) Prior Publication Data
US 2019/0377932 A1    Dec. 12, 2019

(51) Int. Cl.
*G06K 9/00*    (2022.01)
*G06V 40/16*    (2022.01)
*G10L 15/26*    (2006.01)

(52) U.S. Cl.
CPC .......... *G06V 40/161* (2022.01); *G06V 40/172* (2022.01); *G10L 15/26* (2013.01)

(58) Field of Classification Search
CPC ............ G06K 9/00228; G06K 9/00288; G10L 15/26; H04N 21/4532; H04N 21/4661; H04N 21/44218; H04N 21/41407; H04N 21/42201; H04N 21/441; G06V 40/161; G06V 40/172

USPC .................................................. 382/115, 118
See application file for complete search history.

(56) References Cited

U.S. PATENT DOCUMENTS

| | | |
|---|---|---|
| 6,499,016 B1 | 12/2002 | Anderson |
| 7,908,629 B2 | 3/2011 | Lewis |
| 8,340,974 B2 | 12/2012 | Zurek et al. |
| 8,589,968 B2 | 11/2013 | Alberth et al. |

(Continued)

FOREIGN PATENT DOCUMENTS

| | | |
|---|---|---|
| AU | 2015/297230 | 2/2017 |
| CN | 104853092 | 8/2015 |

(Continued)

OTHER PUBLICATIONS

Githiru, Titus, "How to Solve Content Not Available in Your Country" https://techweez.com/2018/03/05/solve-content-not-available-country/ (Mar. 5, 2018) (Year: 2018).*

(Continued)

*Primary Examiner* — Andrew M Moyer
(74) *Attorney, Agent, or Firm* — Philip H. Burrus, IV

(57) ABSTRACT

A method in an electronic device includes identifying an authorized user of the electronic device being present within an environment of the electronic device. The method also includes identifying at least one other person also being present within the environment of the electronic device. The method then includes selecting, with one or more processors of the electronic device, content previously partially consumed by the authorized user and the at least one other person and presenting, with the one or more processors, the content on a user interface of the electronic device.

15 Claims, 14 Drawing Sheets

(56) References Cited

U.S. PATENT DOCUMENTS

| | | |
|---|---|---|
| 8,593,452 B2 | 11/2013 | Solem et al. |
| 9,384,386 B2 | 7/2016 | Lee et al. |
| 9,396,354 B1 | 7/2016 | Murphy |
| 9,471,838 B2 | 10/2016 | Miller et al. |
| 9,521,135 B2 | 12/2016 | Sultani |
| 10,146,925 B1 | 12/2018 | Rosenberg |
| 2002/0141750 A1 | 10/2002 | Ludtke et al. |
| 2003/0113109 A1 | 6/2003 | Pelletier |
| 2004/0264810 A1 | 12/2004 | Taugher et al. |
| 2005/0166161 A1* | 7/2005 | Makela ............. H04M 1/72445 715/854 |
| 2006/0005168 A1 | 1/2006 | Singh |
| 2006/0056666 A1* | 3/2006 | Mizutani ............. G06V 40/166 382/118 |
| 2006/0282572 A1 | 12/2006 | Steinberg et al. |
| 2007/0081090 A1 | 4/2007 | Singh |
| 2007/0127833 A1 | 6/2007 | Singh |
| 2007/0236575 A1 | 10/2007 | Jokinen et al. |
| 2009/0150784 A1* | 6/2009 | Denney .................. G11B 27/34 715/722 |
| 2009/0220093 A1 | 9/2009 | Hodges et al. |
| 2010/0124363 A1 | 5/2010 | Ek |
| 2010/0332226 A1 | 12/2010 | Lee et al. |
| 2011/0069940 A1* | 3/2011 | Shimy ................ H04N 5/44543 386/296 |
| 2011/0199510 A1 | 8/2011 | Ono et al. |
| 2011/0202968 A1 | 8/2011 | Nurmi |
| 2011/0258706 A1* | 10/2011 | Rouse ..................... G06F 21/10 726/28 |
| 2012/0061076 A1 | 3/2012 | Chai et al. |
| 2012/0219273 A1* | 8/2012 | McWilliams .......... H04N 5/783 386/344 |
| 2012/0250951 A1 | 10/2012 | Chen |
| 2012/0257797 A1 | 10/2012 | Leyvand et al. |
| 2012/0310783 A1* | 12/2012 | Kelly .................... G06Q 20/123 705/27.1 |
| 2013/0011068 A1 | 1/2013 | Alboueyh et al. |
| 2013/0169839 A1 | 7/2013 | Takahashi |
| 2013/0174069 A1* | 7/2013 | Lee ....................... G06F 3/0486 715/769 |
| 2013/0318475 A1* | 11/2013 | Xie ....................... G06F 3/0482 715/823 |
| 2014/0109231 A1 | 4/2014 | Takaoka |
| 2014/0160316 A1 | 6/2014 | Hwang |
| 2014/0344734 A1* | 11/2014 | Xu ....................... G06F 3/04817 715/765 |
| 2015/0067721 A1* | 3/2015 | Cadena Vedova .... H04W 80/12 725/32 |
| 2015/0095844 A1* | 4/2015 | Cho ....................... G06F 3/0488 715/784 |
| 2015/0106627 A1 | 4/2015 | Holman et al. |
| 2015/0113661 A1 | 4/2015 | Mishra |
| 2015/0128158 A1 | 5/2015 | Wheatley |
| 2015/0187390 A1 | 7/2015 | Pacurariu et al. |
| 2015/0227782 A1 | 8/2015 | Salvador et al. |
| 2016/0034704 A1 | 2/2016 | Shim et al. |
| 2016/0050341 A1 | 2/2016 | Erdler |
| 2016/0057497 A1* | 2/2016 | Kim ................... H04N 21/4542 725/10 |
| 2016/0080628 A1 | 3/2016 | Konicek |
| 2016/0182579 A1* | 6/2016 | Tsang ................. H04L 65/1069 709/204 |
| 2016/0203386 A1 | 7/2016 | Porecki et al. |
| 2016/0227295 A1* | 8/2016 | Casey ............. H04N 21/47202 |
| 2017/0041523 A1 | 2/2017 | Rifkin et al. |
| 2017/0193282 A1 | 7/2017 | Valko et al. |
| 2018/0005395 A1* | 1/2018 | D'Angelo .......... G08B 21/0461 |
| 2018/0014198 A1 | 1/2018 | Suh et al. |
| 2018/0046814 A1 | 2/2018 | Manoharan et al. |
| 2018/0189505 A1 | 7/2018 | Ghafourifar et al. |
| 2018/0268022 A1* | 9/2018 | Rose .................. G06F 16/2477 |
| 2018/0310070 A1* | 10/2018 | Murray .............. H04N 21/4622 |
| 2019/0141399 A1* | 5/2019 | Auxer ................ H04N 21/4753 |
| 2019/0311512 A1* | 10/2019 | VanBlon ............ H04M 1/72445 715/854 |
| 2019/0384924 A1 | 12/2019 | Adams et al. |
| 2021/0058355 A1* | 2/2021 | Dawes .................. G06F 40/205 |

FOREIGN PATENT DOCUMENTS

| | | |
|---|---|---|
| KR | 1020100003918 | 1/2010 |
| WO | 2014/143534 | 9/2014 |
| WO | 2014/158508 | 10/2014 |
| WO | 2016/017975 | 2/2016 |

OTHER PUBLICATIONS

Wu, Zhenzhen, "Notice of Allowance", U.S. Appl. No. 15/881,793, filed Jan. 28, 2018; dated Feb. 20, 2020.

Pasiewicz, Daniel, "NonFinal Office Action", U.S. Appl. No. 15/946,522, filed Apr. 5, 2018; dated Oct. 11, 2019.

Wu, Zhenzhen, "Final OA", U.S. Appl. No. 15/881,793, filed Jan. 28, 2018; Mailed Nov. 21, 2019.

Wu, Zhenzhen, "NonFinal Office Action", U.S. Appl. No. 15/881,793, filed Jan. 28, 2018; dated Jun. 26, 2019.

Dickson, Rianis, "Office Action", Application No. GB1904063.3 dated Sep. 23, 2019, BIPLaw received Mar. 20, 2020.

Pasiewicz, Daniel M., "Final Office Action", U.S. Appl. No. 15/946,522, filed Apr. 5, 2018; dated Mar. 20, 2020.

Priyanu, Pakpum, "Search Report and Written Opinion", PCT/US2019/013362; Filed Jan. 11, 2019; dated Mar. 8, 2019.

Exner, Karin, "PCT Search Report and Written Opinion", PCT/US2019/023928; Filed Mar. 25, 2019; dated May 13, 2019.

EXIF Tags—Description and Tools; Published on https://www.sno.phy.queensu.ca/~phil/exiftool/TagNames/EXIF.html Unknown Publication Date but last revised Feb. 13, 2018.

Unidentified List of Prior Art Provided by Inventor; Unknown date of publication, assumed to be prior to filing of present application.

"1 Beyond AutoTracker", AutoTracker Camera http://1beyond.com/autotracker; Unknown publication date but prior to filing of present application.

"Cisco TelePresence SpeakerTrack 60", Cisco; Available at https://cicso.com; Unknown Publication Date prior to filing of present application.

"Eyeworks: Multi-Display Module—Software", Multi-Display eye tracking for applied research; Available at http://www.eyetracking.com/Software/EyeWorks/Multi-Display; Unknown Publication Date but prior to filing of present application.

"How to Copyright Photographs", Published on WikiHow; https://www.wikihow.com/Copyright-Photographs ; Exact Publication Date Unknown but prior to filing of present application.

"Inventor Identified Prior Art", Microsoft Office 16; Remember feature Unknown publication date but prior to filing of present application.

"Inventor Identified Prior Art", Video functionality to continue or restart after asleep; Unknown source; Unknown publication date but prior to filing of present application.

"JPEG Roatation and EXIF Orientation", Instructions published on Impulse Adventure Website; https://www.impulseadventure.com/photo/exif-orientation.html ; Exact Publication Date unknown but prior to filing of present application.

"Logo Licious", Logo Licious—Add your own logo, watermark, and text to photos; App available on GooglePlay; Initial Publicaiton Unknown; Updated Mar. 2, 2018.

"Soloshot—Your Personal Robot Cameraman", Soloshot; Available at https://soloshot.com; Unknown publication date but prior to filing of present application.

Alameh, et al., "Electronic Devices and Methods for Blurring and Revealing Persons Appearing in Images", Application Filed Jan. 28, 2018; Specification and Figures.

Bailey, Jonathan, "Adding Copyright to Exif Automatically", Article Published on website Plagiarism Today; https://www.plagiarismtoday.com/2009/03/26/adding-copyright-to-exif-automatically/; Published Mar. 26, 2009.

(56) References Cited

OTHER PUBLICATIONS

Doerrfeld, Bill, "20+ Emotion Recognition APIs That Will Leave You Impressed, and Concerned", Blog; Posted at https://nordicapis.com/author/billdoerrfeld/ ; Posted Dec. 31, 2015.

Peters, Richard, "Add copyright info to your photos EXIF", Richard Peters Wildlife Photography; Available at https://www.richardpeters.co.uk/quick-tip-add-copyright-info-to-your-photos-exif/; Unknown Publication Date but prior to filing of present application.

Wilhelm, Parker, "Try Google's emotion-detecting image API for yourself", Article published on TechRadar; www.techradar.com; Published Feb. 18, 2016.

* cited by examiner

METHODS AND DEVICES FOR IDENTIFYING MULTIPLE PERSONS WITHIN AN ENVIRONMENT OF AN ELECTRONIC DEVICE

BACKGROUND

Technical Field

This disclosure relates generally to electronic devices, and more particularly to electronic devices comprising sensors.

Background Art

Modern communication devices, such as smartphones and tablet computers, offer more computing power than did the desktop computers of just a few years ago. A modern smartphone can be used not only to make voice calls, but to take pictures and capture video, send text and multimedia messages, and surf the Internet.

While this computing power allows these devices to offer additional feature sets, accessing features can be cumbersome. A person looking for a picture or video, for example, may need to navigate through numerous display screens and user interface controls trying to find the file. It would be advantageous to have an improved user interface facilitating more seamless selection and presentation of content.

Figure 1:
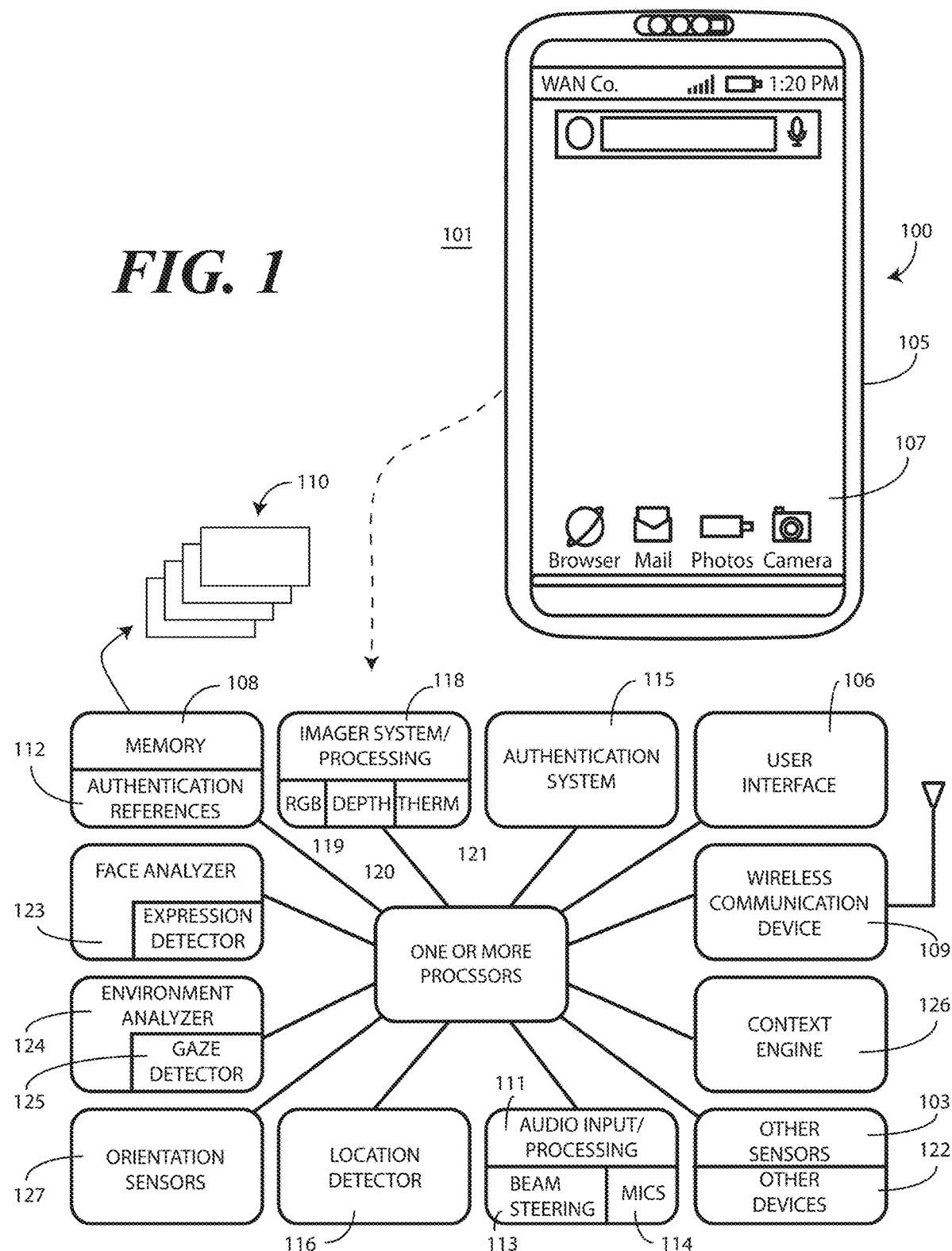
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to selecting, with one or more processors of an electronic device, content previously partially consumed by an authorized user and at least one other person, and presenting, with the one or more processors, the content on a display of the electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of selecting and presenting content partially consumed by an authorized user of an electronic device and at least one other person when the authorized user and the other person are identified as being present within an environment of the electronic device as described herein. The non-processor circuits may include, but are not limited to, a radio receiver, a radio transmitter, signal drivers, clock circuits, power source circuits, and user input devices. As such, these functions may be interpreted as steps of a method to perform the selection and presentation of content partially consumed by an authorized user of an electronic device and at least one other person when the authorized user and the other person are identified as being present within an environment of the electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide electronic devices, systems, and methods for identifying, with one or more sensors, an authorized user of the electronic device want at least one other person being present within an environment of the electronic device. Where this occurs, in one or more embodiments one or more processors of the electronic device can select content previously partially consumed by the authorized user and the at least one other person, and then present that content on a display of the electronic device and/or through audio output devices of the electronic device.

Illustrating by example, presume that the authorized user of an electronic device is a woman who is married to a man. This husband and wife may enjoy "binge" watching serial episodes of television shows via a streaming service. Now imagine that the two were in the middle of episode 452 the previous night, when bedtime arrived. They thus turned the television OFF mid-show.

Now imagine that it is the next day. The wife is looking at a smartphone configured in accordance with one or more embodiments of the disclosure. One or more sensors of the electronic device seamlessly identify her as the authorized user, thereby unlocking the electronic device and allowing her to use its feature set.

In one or more embodiments, the sensors continue to monitor the environment of the electronic device. Now presume that the husband enters the environment. In one or more embodiments, the one or more sensors identify the husband as being present in the environment. In one or more embodiments, one or more processors of the electronic device, in response to detecting the authorized user, here the wife, and at least one other person, here the husband, being within the environment of the electronic device, and are optionally both looking at device, then select content previously partially consumed by the husband and wife. In this illustration, an example of such content would be episode 452 of the series currently being binge watched.

In one or more embodiments, the one or more processors then present, on a display of the electronic device, episode 452 at the point where the couple stopped watching. Advantageously, embodiments of the disclosure seamlessly detect persons within an environment of the electronic device and, in response, select and present previously partially consumed content to them. Thus, when the husband is present and looking at the device, the show resumes on the smartphone, despite the fact that they had last watched on a television. When the husband leaves, the show stops again.

In one or more embodiments, an electronic device comprises one or more sensors identifying at least one authorized user of the electronic device within an environment of the electronic device and at least one other person within the environment of the electronic device. In one or more embodiments, the electronic device also comprises a user interface and one or more processors.

In one or more embodiments, the one or more processors are operable with the user interface and retrieve content previously presented on the user interface of the electronic device when both the at least one authorized user of the electronic device and the at least one other person were within the environment of the electronic device. The one or more processors can then change a content presentation on the user interface to repeat presentation of the content upon detecting both the at least one authorized user of the electronic device and the at least one other person are within the environment of the electronic device.

Illustrating by example, embodiments of the disclosure contemplate that an electronic device can have many different applications that are operational thereon. Some might be used frequently by the wife in the example above, while others are used frequently by the husband. However, some applications may be used frequently by the husband and wife together. Illustrating by example, the couple may use a music streaming application to play music while cooking. Such an application would thus comprise content previously presented on the user interface when both the at least one authorized user of the electronic device and the at least one other person were within the environment of the electronic device, i.e., when the couple was cooking together last night. Today, when the presence of both the husband and wife are detected within the environment, in one embodiment the one or more processors may change the content presentation upon detecting both the at least one authorized user of the electronic device and the at least one other person are within the environment of the electronic device by changing whatever application was operational to the streaming music player so that the song they were listening to last night could resume playing.

Advantageously, embodiments of the disclosure provide methods and systems for seamlessly highlighting common content when two or more people are present within an environment of an electronic device. Common content can include content such as electronic books, music, videos, photographs, movies, or television programs that were recently being consumed by the two or more people, such as the day before or happened in the past such as during a trip last year, a time period, an anniversary, a dinner. Embodiments of the disclosure can optionally highlight the common content when the two or more people are both present within the environment and are looking at the electronic device in some embodiments.

In one or more embodiments, when two people are sitting next to each other and are looking at the electronic device, an authentication system operational on the electronic device identifies each person and optionally confirms each person is actually looking at the electronic device. In one or more embodiments, at least one person must be authenticated as the authorized user of the electronic device to prevent miscreants from gaining access to the electronic device. If the authorized user has elected user settings within the electronic device such that it is always unlocked, which is rare, then authentication may not be required for one of the two.

In one or more embodiments, once an authorized user is authenticated and the identity of another person is determined, common content is presented and/or highlighted and/or presented in the display. Examples of common content include applications, media, video content, textual content, images, electronic books, music, and so forth. Other examples of common content will be described below. Still other examples of common content will be obvious to those of ordinary skill in the art having the benefit of this disclosure.

In one or more embodiments, prior communications and/or engagements and/or common occurrences between the two people is presented and/or highlighted. Alternatively, such communications, engagements, or common occurrences can be brought to the home screen of the display, elevated within each application, and so forth. For example, images of the two people within an image gallery can be brought to the forefront or highlighted. Electronic mail correspondence in a mail application may be brought to the top or highlighted. Commonly dialed telephone numbers may be presented on the display in a voice communication application. Text or multimedia messages between the two people may be brought to the forefront or highlighted or grouped. Contacts commonly contacted by the people may be brought to the forefront or highlighted in an address book application. Commonly viewed social media applications or sites may be brought to the forefront or highlighted. These are examples only, as others will be obvious to those of ordinary skill in the art having the benefit of this disclosure.

In one or more embodiments, upon detecting both the at least one authorized user of the electronic device and the at least one other person are within the environment of the electronic device, a "home screen" of an electronic device can change so that applications commonly used by both the at least one authorized user of the electronic device and the at least one other person are presented. In cases where the authorized user does not want to have their home screen so changed, in one or more embodiments a new folder with shortcuts to applications commonly used by both the at least one authorized user of the electronic device and the at least one other person can appear.

In one or more embodiments, upon detecting both the at least one authorized user of the electronic device and the at least one other person are within the environment of the electronic device, when a media consumption application, such as a streaming music or video application, is started, the content the authorized user of the electronic device and the at least one other person were previously consuming is presented. Illustrating by example, imagine the husband and wife from the previous examples had been watching a show the night prior, but had not finished it. In one or more embodiments, upon detecting both the husband and the wife are within the environment of the electronic device, the media consumption application launches the show from the last point watched by the pair. In other embodiments, the media consumption application might start a predetermined time prior to the last point watched, such as thirty seconds or one minute, to help remind them of what they were watching.

In one embodiment, after a brief pause the media consumption application may allow the husband or wife to cancel the presentation of the show. This may be invoked in the event that they did not want to watch the show at that moment, for instance. If the couple had finished the show, the media consumption application might queue up the next episode in one embodiment. If the couple had finished the series, the media consumption application might suggest a new, similar series. In one or more embodiments the one or more processors in a memory of the electronic device, or alternatively in cooperation with a remote electronic device, such as a server across the "cloud," can maintain a history of content the at least one authorized user of the electronic device and the at least one other person consume together. It is noted that this history can be quite different from listings of content the at least one authorized user of the electronic device and the at least one other person consume separately. It should also be noted that embodiments of the disclosure are not limited to two people. If, continuing the example from above, the husband and wife are joined by their child, the content presentation might change from the show the husband and wife last consumed together to another show that the husband, wife, and child had last consumed together.

In addition to video and audio content, static content like images and electronic books can be used with embodiments of the disclosure. Illustrating by example, in one or more embodiments, upon detecting both the at least one authorized user of the electronic device and the at least one other person are within the environment of the electronic device, when an electronic book reader is launched, an electronic book being read by both the at least one authorized user of the electronic device and the at least one other person can be retrieved and presented so that the pair can start reading together. With any form of media, including electronic books, bookmarks can be applied to the content to mark where each person or group of persons stopped consuming the content. Using the electronic book being read by the husband and wife as an illustration, embodiments of the disclosure may place three bookmarks in the electronic book for future reference: one where the wife stopped reading individually, one where the husband stopped reading individually, and one where the couple stopped reading together. If, at a future date the authorized user of the electronic device is detected within the environment, here the wife, the one or more processors will retrieve the electronic book and present its contents beginning at the bookmark where the wife stopped reading individually. If, at a later time, the husband is detected as being within the environment of the electronic device, the one or more processors can create a new bookmark the content where the wife stopped reading individually and then jump to the bookmark where the husband and wife stopped reading together.

In the case of music, embodiments of the disclosure are advantageously operable to create playlists from various devices. Illustrating by example, when one or more sensors of the electronic device identify an authorized user of the electronic device within an environment of the electronic device, in one embodiment a music player application can begin playing a combination of the authorized user's favorite songs. When at least one other person is identified by the one or more sensors as being present within the environment of the electronic device, the one or more processors can select content previously consumed by the at least one authorized user and the at least one other person. For instance, the one or more processors may append the playlist of the authorized user with favorite songs of the other person, thereby creating a new playlist. In a party situation, as each new guest arrives their party mixes can be amended into the cumulative playlist.

Not only to embodiments of the disclosure select, with one or more processors of the electronic device, content previously partially consumed by the authorized user and the at least one other person and presenting, with the one or more processors, the content on a display of the electronic device in response to identifying, with one or more sensors of the electronic device, an authorized user of the electronic device being present within an environment of the electronic device and also identifying, with the one or more sensors of the electronic device, at least one other person, also present within the environment of the electronic device, embodiments of the disclosure can further change how the content is being presented or consumed. Said differently, in one or more embodiments the one or more processors can select a content delivery application for the content from a plurality of content delivery applications as a function of a previously used content delivery application upon which the content was previously partially consumed.

Illustrating by example using an electronic book with the husband and wife team, the husband may prefer to listen to the electronic book as an audio book. The wife may prefer to read the electronic book on a specialized reader using an electronic ink display. However, each of these content delivery applications may be unsuitable for group use. For example, the wife may be irritated by the audio book narrator's voice. The specialized reader may be too small for both persons to see. Accordingly, when an electronic device detects the other person within the environment of the electronic device, in one or more embodiments the one or more processors not only retrieve and present the previously consumed content, they also select a content delivery application. If, for instance, the husband is the authorized user of the device and is listening to the audio book, and the one or more sensors detect the wife within the environment of the electronic device, the one or more processors may select an electronic book reader application for the electronic device and switch to that application from the audio book reader application. Additionally, the one or more processors may update the husband's personal bookmark, jump to the shared bookmark, and present that page of the electronic book on the display. When the wife leaves, the one or more processors can update the combined bookmark, switch back to the audio book application, jump to the husband's bookmark, and continue playing the audio book in one or more embodiments.

For photographs, upon identifying an authorized user of the electronic device, present within an environment of the electronic device, and also identifying, with the one or more sensors of the electronic device, at least one other person, also present within the environment of the electronic device, the one or more processors can bring to the front or top of the presentation images involving both persons presently situated within the environment of the electronic device. Using vacation photos presentable by a photo gallery application as an example, when the authorized user and the other person are detected within the environment of the electronic device, the one or more processors can cause the gallery application to bring to the front/top all pictures from the trip involving the two people. In another embodiment, when the authorized user and the other person are detected within the environment of the electronic device, the one or more processors can cause the gallery application to bring to the front/top pictures taken together. In another embodiment, when the authorized user and the other person are detected within the environment of the electronic device, the one or more processors can cause the gallery application to bring to the front/top pictures of people and places the authorized user and other person have in common or share an interest in, such as children, pets, landscapes, and sports. Factors such as location or the time of day can be included to present content shared by the authorized user and the other person at, e.g., the same time (say December) to be highlighted.

For social media, when the authorized user and the other person are detected within the environment of the electronic device, the one or more processors can cause a social media application to bring to the front communications between the authorized user and the other person. In another embodiment, when the authorized user and the other person are detected within the environment of the electronic device, the one or more processors can cause a social media application to bring to the front pictures featuring interaction between the authorized user and the other person. In another embodiment, when the authorized user and the other person are detected within the environment of the electronic device, the one or more processors can cause a social media application to bring to the front vacation content between the authorized user and the other person. Date stamps can be presented in addition to the content to remind the authorized user and the other person when the content was created.

For anniversaries and holidays, an authorized user of an electronic device can gather one or more other persons around their electronic device. As these other personas are identified as being within the environment of the electronic device, common content can be retrieved and presented on the display. For instance, on Christmas day an authorized user can gather the family around an electronic device configured in accordance with one or more embodiments of the disclosure to revisit, recollect, and remember everything the family did together ever Christmas by bringing that common content to the principal location on the display. In this embodiment of the disclosure, the combined common content can be retrieved on a basis recurring annually at certain anniversary dates, and holidays. Embodiments of the disclosure can also use location in place of calendar date to retrieve common content for presentation on the display.

Embodiments of the disclosure can also be used for collaboration. For example, if an authorized user of an electronic device an another person were collaborating on a document, when one or more sensors of an electronic device identify the authorized user of the electronic device being present within an environment of the electronic device and the other person also being present within the environment of the electronic device, the one or more processors can retrieve the document and present it on the display. The one or more processors can optionally highlight portions previously worked on for ease of access.

Advantageously, embodiments of the disclosure provide for seamless identification of multiple persons being within an environment of an electronic device at the same time, using sensors from a single device. Embodiments of the disclosure can optionally additionally determine that the persons are looking at the single device.

Embodiments of the disclosure can display common content to multiple viewers on a device display when at least one of the viewers is authenticated as the owner of the device. Embodiments of the disclosure can advantageously maintain a history of what content the individuals have actually consumed, e.g., watched, together since this historical log may be different from logs maintaining a history of what each person watches separately. Embodiments of the disclosure can pickup and/or rewind content (potentially rewind by some small amount, e.g., fifteen or twenty seconds before where the last terminated consumption of the content) to where it was most recently consumed by the persons.

Embodiments of the disclosure can, in situations where there are multiple ways content may be consumed, e.g., multiple content delivery applications, remember how the content was consumed in each case. Advantageously, embodiments of the disclosure can select a particular content delivery application as a function of identifying the authorized user and at least one other person being within the environment of the electronic device. Embodiments of the disclosure can switch to the consumption method, i.e., the content delivery application, as a function of the people present in one or more embodiments.

In situations where a preferred content delivery application is unavailable for whatever reason, the one or more processors can select a next best option content delivery application. For instance, if three people usually watch a television program using streaming application A, and those people are traveling where streaming application A is unavailable, the one or more processors may select a web browser or other application to stream the content.

Embodiments of the disclosure can optionally highlight common content within a content delivery application so that it is easier to located. Such highlighting can occur, in one embodiment, after an authorized user and at least one other person are seamlessly authenticated. In one or more embodiments, one or more processors can highlight within content delivery applications all common content related to the identified people looking at device, thereby making the content visible on display so long as at least the authorized user is looking at display. This highlighting can include highlighting common content collected together, common content collected separately, recurring content if the current date is an anniversary or holiday (marriage, birth, holiday, etc.), and/or recurring content if a currently detected location matches an anniversary event (vacation, trips, etc.). The above list includes just some of the advantages of embodiments of the disclosure. Numerous others will be obvious to those of ordinary skill in the art having the benefit of this disclosure.

Turning now to FIG. 1, illustrated therein is one explanatory electronic device 100 in accordance with one or more embodiments of the disclosure. The electronic device 100 is configured, in one or more embodiments, to identify one or more persons positioned within an environment 101 of the electronic device 100.

In one or more embodiments, the electronic device 100 includes various sensors 103.

These sensors 103 can include an imager system, an audio sensor, proximity detectors, orientation sensors, a location detector, a context sensor, a radio frequency (RF) sensor, a presence sensor, a beacon, or other sensors. The electronic device 100 also includes on or more processors 102 that are operable with the one or more sensors 103. In one or more embodiments, the one or more sensors 103 are operable to detect a plurality of persons within a predefined environment 101 about the electronic device 100. As will be described in more detail below, in one or more embodiments the one or more sensors 103, in conjunction with one or more processors 102, can also identify at least one person of the plurality of persons as an authorized user of the electronic device 100.

In one or more embodiments, the one or more sensors 103, in conjunction with the one or more processors 102, can also identify one or more of the plurality of persons as well. If, for example, a second person is a good friend of the authorized user, and is frequently within the environment 101 of the electronic device 100, the one or more sensors 103 and/or one or more processors 102 may be able to identify that person as well. While the other person may not be identified as the authorized user of the electronic device 100, they may still be identified for other purposes, as will be explained in more detail below.

Also illustrated in FIG. 1 is one explanatory block diagram schematic 104 of the explanatory electronic device 100. In one or more embodiments, the block diagram schematic 104 is configured as a printed circuit board assembly disposed within a housing 105 of the electronic device 100. Various components can be electrically coupled together by conductors or a bus disposed along one or more printed circuit boards.

The illustrative block diagram schematic 104 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 104 includes a user interface 106. In one or more embodiments, the user interface 106 includes a display 107, which may optionally be touch-sensitive. In one embodiment, users can deliver user input to the display 107 of such an embodiment by delivering touch input from a finger, stylus, or other objects disposed proximately with the display 107. In one embodiment, the display 107 is configured as an active matrix organic light emitting diode (AMOLED) display. However, it should be noted that other types of displays, including liquid crystal displays, suitable for use with the user interface 106 would be obvious to those of ordinary skill in the art having the benefit of this disclosure.

In one embodiment, the electronic device includes one or more processors 102. In one embodiment, the one or more processors 102 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 104. Each of the application processor and the auxiliary processor(s) can be configured to process and execute executable software code to perform the various functions of the electronic device with which the block diagram schematic 104 operates. A storage device, such as memory 108, can optionally store the executable software code used by the one or more processors 102 during operation.

In this illustrative embodiment, the block diagram schematic 104 also includes a communication circuit 109 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 109 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 109 can include wireless communication circuitry, one of a receiver, a transmitter, or transceiver, and one or more antennas.

In one embodiment, the one or more processors 102 can be responsible for performing the primary functions of the electronic device with which the block diagram schematic 104 is operational. For example, in one embodiment the one or more processors 102 comprise one or more circuits operable with the user interface 106 to present presentation information to a user. The executable software code used by the one or more processors 102 can be configured as one or more modules 110 that are operable with the one or more processors 102. Such modules 110 can store instructions, control algorithms, and so forth.

In one or more embodiments, the block diagram schematic 104 includes an audio input/processor 111. The audio input/processor 111 is operable to receive audio input from an environment (101) about the electronic device 100. The audio input/processor 111 can include hardware, executable code, and speech monitor executable code in one embodiment. The audio input/processor 111 can be operable with one or more predefined authentication references 112 stored in memory 108.

With reference to audio input, the predefined authentication references 112 can comprise representations of basic speech models, representations of trained speech models, or other representations of predefined audio sequences that are used by the audio input/processor 111 to receive and identify voice commands that are received with audio input captured by an audio capture device. In one embodiment, the audio input/processor 111 can include a voice recognition engine. Regardless of the specific implementation utilized in the various embodiments, the audio input/processor 111 can access various speech models stored with the predefined authentication references 112 to identify speech commands.

The audio input/processor 111 can include a beam steering engine 113 comprising one or more microphones 114. Input from the one or more microphones 114 can be processed in the beam steering engine 113 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone, or switching various microphones ON and OFF individually. In one or more embodiments, two or more microphones 114 can be included for selective beam steering by the beam steering engine 113.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 113 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager can estimate a location of a person's face and deliver signals to the beam steering engine 113 alerting it in which direction to focus the acoustic reception cone and/or steer the first microphone and the second microphone, thereby adding confirmation to audio steering and saving time. Where multiple people are around the electronic device 100, this steering advantageously directs a beam reception cone to the authorized user.

Alternatively, the beam steering engine 113 processes and combines the signals from two or more microphones to perform beam steering. The one or more microphones 114 can be used for voice commands. In response to control of the one or more microphones 114 by the beam steering engine 113, a user location direction can be determined. The beam steering engine 113 can then select between the first microphone and the second microphone to beam steer audio reception toward the user. Alternatively, the audio input/processor 111 can employ a weighted combination of the microphones to beam steer audio reception toward the user.

In one embodiment, the audio input/processor 111 is configured to implement a voice control feature that allows a user to speak a specific device command to cause the one or more processors 102 to execute a control operation. For example, the user may say, "Authenticate Me Now." This statement comprises a device command requesting the one or more processors to cooperate with the authentication system 115 to authenticate a user. Consequently, this device command can cause the one or more processors 102 to access the authentication system 115 and begin the authentication process. In short, in one embodiment the audio input/processor 111 listens for voice commands, processes the commands and, in conjunction with the one or more processors 102, performs a touchless authentication procedure in response to voice input.

The one or more processors 102 can perform filtering operations on audio input received by the audio input/processor 111. For example, in one embodiment the one or more processors 102 can filter the audio input into authorized user generated audio input, i.e., first audio input, and other audio input, i.e., second audio input.

Various sensors 103 can be operable with the one or more processors 102. A first example of a sensor that can be included with the various sensors 103 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 102, to detect an object in close proximity with—or touching—the surface of the display 107 or the housing 105 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor 103 is a geo-locator that serves as a location detector 116. In one embodiment, location detector 116 is able to determine location data when authenticating a user. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 116 autonomously or with assistance from terrestrial base stations, for example those associated with a cellular communication network or other ground based network, or as part of a Differential Global Positioning System (DGPS), as is well known by those having ordinary skill in the art. The location detector 116 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 117 that determines an orientation and/or movement of the electronic device 100 in three-dimensional space. Illustrating by example, the orientation detector 117 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 117 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

An authentication system 115 is operable with the one or more processors 102. A first authenticator 118 of the authentication system 115 can include an imager 119, a depth imager 120, and a thermal sensor 121, or any of these in any combination. In one embodiment, the imager 119 comprises a two-dimensional imager configured to receive at least one image of a person within an environment of the electronic device 100. In one embodiment, the imager 119 comprises a two-dimensional Red-Green-Blue (RGB) or Near-Infrared (NIR) imager. In another embodiment, the imager 119 comprises an infrared imager. Other types of imagers suitable for use as the imager 119 of the authentication system will be obvious to those of ordinary skill in the art having the benefit of this disclosure. The authentication system 115 can optionally be configured as a touch system (Pincode, fingerprint sensor) or other touchless systems (voice authentication, iris detection/authentication).

The thermal sensor 121 can also take various forms. In one embodiment, the thermal sensor 121 is simply a proximity sensor component included with the other components 122. In another embodiment, the thermal sensor 121 comprises a simple thermopile. In another embodiment, the thermal sensor 121 comprises an infrared imager that captures the amount of thermal energy emitted by an object. Other types of thermal sensors 121 will be obvious to those of ordinary skill in the art having the benefit of this disclosure.

The depth imager 120 can take a variety of forms. In a first embodiment, the depth imager 120 comprises a pair of imagers separated by a predetermined distance, such as three to four images. This "stereo" imager works in the same way the human eyes do in that it captures images from two different angles and reconciles the two to determine distance.

In another embodiment, the depth imager 120 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 120 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 120 adds a third "z-dimension" to the x-dimension and y-dimension defining the two-dimensional image captured by the imager 119, thereby enhancing the security of using a person's face as their password in the process of authentication by facial recognition.

In one or more embodiments, the authentication system 115 can be operable with a face analyzer 123 and an environmental analyzer 124. The face analyzer 123 and/or environmental analyzer 124 can be configured to process an image or depth scan of an object and determine whether the object matches predetermined criteria by comparing the image or depth scan to one or more predefined authentication references 112 stored in memory 108.

For example, the face analyzer 123 and/or environmental analyzer 124 can operate as an authentication module configured with optical and/or spatial recognition to identify objects using image recognition, character recognition, visual recognition, facial recognition, color recognition, shape recognition, and the like. Advantageously, the face analyzer 123 and/or environmental analyzer 124, operating in tandem with the authentication system 115, can be used as a facial recognition device to determine the identity of one or more persons detected about the electronic device 100.

These persons can be further identified as an identified, authorized user of the electronic device, or identified, non-authorized user of the electronic device 100. If, for example, the imager 119 has captured images and/or the depth imager 120 has captured depth scans of a friend of the authorized user, the authorized user can optionally deliver the user input to the user interface 106 to add identifying characteristics to this data, such as the person's name, relationship to the authorized user, and so forth. Accordingly, the face analyzer 123 and/or environmental analyzer 124 are capable of identifying a large number of persons where such identifying characteristics have been previously stored with the image or depth scan data, even though only one identifiable person may be authenticated as the authorized user of the electronic device 100.

In one embodiment when the authentication system 115 detects a person, one or both of the imager 119 and/or the depth imager 120 can capture a photograph and/or depth scan of that person. The authentication system 115 can then compare the image and/or depth scan to one or more predefined authentication references 112 stored in the memory 108. This comparison, in one or more embodiments, is used to confirm beyond a threshold authenticity probability that the person's face—both in the image and the depth scan—sufficiently matches one or more of the predefined authentication references 112 stored in the memory 108 to identify a person. Where the predefined authentication reference 112 indicates that the identified person is also the authorized user of the electronic device 100, the authentication system 115 can further authenticate that particular person as an authorized user of the electronic device 100.

Beneficially, this optical recognition performed by the authentication system 115 operating in conjunction with the face analyzer 123 and/or environmental analyzer 124 allows access to the electronic device 100 only when one of the persons detected about the electronic device 100 are sufficiently identified as an authorized user of the electronic device 100. However, at the same time, when the imager 119 captures an image of an environment 101 of the electronic device 100, and that environment 101 comprises one or more persons, the optical recognition performed by the authentication system 115 operating in conjunction with the face analyzer 123 and/or environmental analyzer 124 allows for the identification of any person who has corresponding identifying characteristics stored with the image or depth scan data in the memory 108. Thus, where four persons are within the environment 101 of the electronic device 100, the optical recognition performed by the authentication system 115 operating in conjunction with the face analyzer 123 and/or environmental analyzer 124 may identify one as an authorized user of the electronic device 100, one as a friend of the authorized user, one as a cousin of the authorized user, and so forth.

In one or more embodiments the one or more processors 102, working with the authentication system 115 and the face analyzer 123 and/or environmental analyzer 124 can determine whether at least one image captured by the imager 119 matches a first predefined criterion, whether at least one facial depth scan captured by the depth imager 120 matches a second predefined criterion, and whether the thermal energy identified by the thermal sensor 121 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 102 use this information to identify a person when the at least one image matches the first predefined criterion, the at least one facial depth scan matches the second predefined criterion, and the thermal energy matches the third predefined criterion. Where different sensors are used, such as an audio sensor, these criteria may change. For example, the first predefined criterion may be whether a detected voice matches previous registered samples. Where the predefined authentication reference 112 indicates that the identified person is also the authorized user of the electronic device 100, the authentication system 115 can further authenticate that particular person as an authorized user of the electronic device 100.

In one or more embodiments, a user can "train" the electronic device 100 by storing predefined authentication references 112 in the memory 108 of the electronic device 100. Illustrating by example, a user may take a series of pictures. They can include identifiers of special features such as eye color, sink color, air color, weight, and height. They can include the user standing in front of a particular wall, which is identifiable by the environmental analyzer from images captured by the imager 119. They can include the user raising a hand, touching hair, or looking in one direction, such as in a profile view. These can then be stored as predefined authentication references 112 in the memory 108 of the electronic device 100. This can be done not only for an authorized user, but others as well as described above.

In other embodiments, the seamless authentication offered by the authentication system 115 can be substituted with a more traditional authentication system. Illustrating by example, rather than employing the authentication system 115 the electronic device 100 may authenticate an authorized user via entry of a pincode. In still another embodiment, the authentication system 115 the electronic device 100 may authenticate an authorized user via a fingerprint sensor. In still another embodiment, the authentication system 115 the electronic device 100 may authenticate an authorized user via detection of a companion device, such as a smartwatch, via a near field wireless communication connection such as Bluetooth.sup.TM or radio frequency received signal strength indication. Where this latter embodiment occurs, content from the two mobile devices in proximity can be merged onto the unlocked device, e.g., favorite apps, common history, matching preferences, etc.

A gaze detector 125 can be operable with the authentication system 115 operating in conjunction with the face analyzer 123. The gaze detector 125 can comprise sensors for detecting the user's gaze point. The gaze detector 125 can optionally include sensors for detecting the alignment of a user's head in three-dimensional space. Electronic signals can then be processed for computing the direction of user's gaze in three-dimensional space. The gaze detector 125 can further be configured to detect a gaze cone corresponding to the detected gaze direction, which is a field of view within which the user may easily see without diverting their eyes or head from the detected gaze direction. The gaze detector 125 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 125 of FIG. 1.

The face analyzer 123 can include its own image/gaze detection-processing engine as well. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 119 or the depth imager 120 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 122 operable with the one or more processors 102 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 122 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 105 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about fifteen feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 102 can cause each proximity sensor component to operate at a first "effective" sensitivity so as to receive infrared emissions from a first distance. Similarly, the one or more processors 102 can cause each proximity sensor component to operate at a second sensitivity, which is less than the first sensitivity, so as to receive infrared emissions from a second distance, which is less than the first distance. The sensitivity change can be effected by causing the one or more processors 102 to interpret readings from the proximity sensor component differently.

By contrast, proximity detector components include a signal emitter and a corresponding signal receiver, which constitute an "active IR" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 122 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 122 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 126 can then operable with the various sensors to detect, infer, capture, and otherwise determine persons and actions that are occurring in an environment about the electronic device 100. For example, where included one embodiment of the context engine 126 determines assessed contexts and frameworks using adjustable algorithms of context assessment employing information, data, and events. These assessments may be learned through repetitive data analysis. Alternatively, a user may employ the user interface 106 to enter various parameters, constructs, rules, and/or paradigms that instruct or otherwise guide the context engine 126 in detecting multi-modal social cues, emotional states, moods, and other contextual information. The context engine 126 can comprise an artificial neural network or other similar technology in one or more embodiments.

In one or more embodiments, the context engine 126 is operable with the one or more processors 102. In some embodiments, the one or more processors 102 can control the context engine 126. In other embodiments, the context engine 126 can operate independently, delivering information gleaned from detecting multi-modal social cues, emotional states, moods, and other contextual information to the one or more processors 102. The context engine 126 can receive data from the various sensors. In one or more embodiments, the one or more processors 102 are configured to perform the operations of the context engine 126.

In one or more embodiments, the one or more processors 102 can be operable with the various authenticators of the authentication system 115. For example, the one or more processors 102 can be operable with a first authenticator and a second authenticator. Where more authenticators are included in the authentication system 115, the one or more processors 102 can be operable with these authenticators as well.

Figure 2:
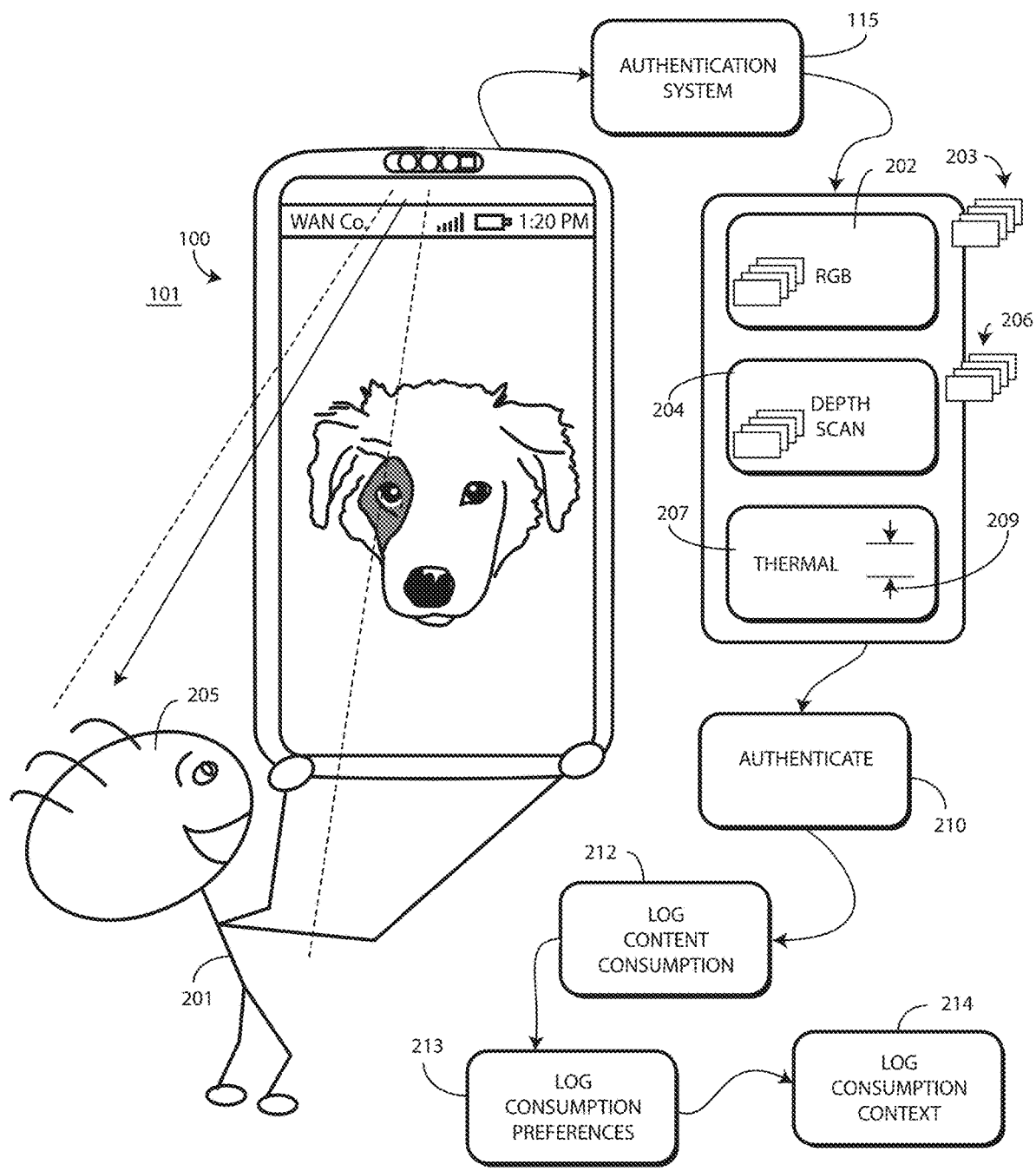
FIG. 2 illustrates one explanatory device, method, and system in accordance with one or more embodiments of the disclosure.

Turning now to FIG. 2, illustrated therein is one explanatory electronic device 100 configured in accordance with one or more embodiments of the disclosure. Also shown in FIG. 2 are one or more method steps for the electronic device 100.

In FIG. 2, a user 201 is present within an environment 101 of the electronic device 100. The user 201 is authenticating himself as an authorized user of the electronic device 100 in accordance with one or more embodiments of the disclosure. In this illustrative embodiment, the authentication process is "touchless" in that the user 201 need not manipulate or interact with the electronic device 100 using his fingers. To the contrary, in accordance with one or more embodiments of the disclosure, the user is authenticated using a combination of two-dimensional imaging, depth scan imaging, thermal sensing, and optionally one or more higher authentication factors.

In this illustrative embodiment, an imager (119) captures at least one image 202 of an object situated within a predefined radius of the electronic device 100, which in this case is the user 201. In one embodiment, the imager (119) captures a single image 202 of the object. In another embodiment, the imager (119) captures a plurality of images of the object. In one or more embodiments, the one or more images are each a two-dimensional image. For example, in one embodiment the image 202 is a two-dimensional RGB or NIR image. In another embodiment, the image 202 is a two-dimensional infrared image. Other types of two-dimensional images will be obvious to those of ordinary skill in the art having the benefit of this disclosure.

In one or more embodiments, the image 202 can be compared to one or more predefined reference images 203. By making such a comparison, one or more processors (102) can confirm whether the shape, skin tone, eye color, hair color, hair length, and other features identifiable in a two-dimensional image are that of the authorized user identified by the one or more predefined reference images 203.

In addition to the imager (119) capturing the image 202, in one or more embodiments a depth imager (120) captures at least one depth scan 204 of the object when situated within the predefined radius of the electronic device 100. In one embodiment, the depth imager (120) captures a single depth scan 204 of the object. In another embodiment, the depth imager (120) captures a plurality of depth scans of the object. The depth scan 204 creates a depth map of a three-dimensional object, such as the user's face 205. This depth map can then be compared to one or more predefined facial maps 206 to confirm whether the contours, nooks, crannies, curvatures, and features of the user's face 205 are that of the authorized user identified by the one or more predefined facial maps 206.

In one or more embodiments, the image 202 and the depth scan 204 are used in combination for authentication purposes. Illustrating my example, in one or more embodiments one or more processors (102) compare the image 202 with the one or more predefined reference images 203. The one or more processors (102) then compare the depth scan 204 with the one or more predefined facial maps 206. Authentication will fail in one or more embodiments unless the image 202 sufficiently corresponds to at least one of the one or more predefined reference images 203 and the depth scan 204 sufficiently corresponds to at least one of the one or more predefined facial maps 206. As used herein, "sufficiently" means within a predefined threshold. For example, if one of the predefined reference images 203 includes five hundred reference features, such as facial shape, nose shape, eye color, background image, hair color, skin color, and so forth, the image 202 will sufficiently correspond to at least one of the one or more predefined reference images 203 when a certain number of features in the image 202 are also present in the predefined reference images 203. This number can be set to correspond to the level of security desired. Some users may want ninety percent of the reference features to match, while other users will be content if only eighty percent of the reference features match, and so forth.

As with the predefined reference images 203, the depth scan 204 will sufficiently match the one or more predefined facial maps 206 when a predefined threshold of reference features in one of the facial maps is met. In contrast to two-dimensional features found in the one or more predefined reference images 203, the one or more predefined facial maps 206 will include three-dimensional reference features, such as facial shape, nose shape, eyebrow height, lip thickness, ear size, hair length, and so forth. As before, the depth scan 204 will sufficiently correspond to at least one of the one or more predefined facial maps 206 when a certain number of features in the depth scan 204 are also present in the predefined facial maps 206. This number can be set to correspond to the level of security desired. Some users may want ninety-five percent of the reference features to match, while other users will be content if only eighty-five percent of the reference features match, and so forth.

The use of both the image 202 and the depth scan 204 as combined authentication factors is far superior to using one or the other alone. The depth scan 204 adds a third "z-dimension" to the x-dimension and y-dimension data found in the image 202, thereby enhancing the security of using the user's face 205 as their password in the process of authentication by facial recognition. Another benefit of using the depth scan 204 in conjunction with the image 202 is the prevention of someone "faking" the imager (119) acting alone by taking an image 202 of a picture of the user 201, rather than the user 201 themselves. Illustrating by example, if only the imager (119) is used, a nefarious person trying to get unauthorized access to the electronic device 100 may simply snap a picture of a two-dimensional photograph of the user 201. The use of a depth scan 204 in conjunction with the image 202 prevents this type of chicanery by requiring that a three-dimensional object, i.e., the actual user 201, be present and within the predefined radius before the authentication system 115 authenticates the user 201.

The opposite is also true. Use of only the depth imager (120), without the imager (119), is similarly problematic. If only the depth imager (120) is used, a nefarious actor attempting to gain unauthorized access to the electronic device 100 may create a three-dimensional, lifelike mask of the user 201. However, the use of the image 202 in conjunction with the depth scan 204 prevents this, as features of the user 201 that are hard to replicate with a mask are verified from the image 202, which is a RGB or NIR image in one or more embodiments. Features such as facial shape, nose shape, eye color, hair color, skin color, and so forth can be sufficiently verified by comparing the image 202 to the one or more predefined reference images 203. Advantageously, the use of the image in conjunction with the depth scan 204 prevents this type of chicanery by capturing a color two-dimensional image of the object, thereby confirming that the object looks like the user 201 in addition to being shaped like the user 201.

While the use of both the image 202 and the depth scan 204 as combined authentication factors is far superior to using one or the other alone, as noted above it is contemplated that a nefarious actor may take even more desperate steps attempt to "spoof" the authentication system 115 if the information stored within the electronic device 100 is sufficiently valuable. Consider the situation where the malefactor goes to the extreme of making a three-dimensional mask of the authorized user with Hollywood-caliber hair and make up so that it is not only shaped like the user 201, but looks like the user 201 as well. While very expensive, such masks can be obtained when the stakes are sufficiently high. If only an image 202 and a depth scan 204 are required for the authentication system 115, this could conceivably result in unauthorized access to the electronic device 100 being obtained.

Advantageously, one or more embodiments of the present disclosure further require a thermal sensor (121) to detect an amount of thermal energy 207 received from an object within a thermal reception radius 208 of the electronic device 100. In one or more embodiments, only where the amount of thermal energy 207 received form the object is within a predefined temperature range 209 will authentication occur, and thus access be granted. Advantageously, this prevents the use of three-dimensional masks from "tricking" the authentication system by masquerading as the actual user 201. Thus, in one or more embodiments, the one or more processors (102) determine whether the amount of thermal energy 207 received from the object, which in this case is the user 201, is within the predefined temperature range 209.

In one or more embodiments, authentication 210 occurs where each of the following is true: the at least one image 202 sufficiently corresponds to at least one of the one or more predefined reference images 203; the at least one depth scan 204 sufficiently corresponds to at least one of the one or more predefined facial maps 206; and the amount of thermal energy 207 received from the object is within the predefined temperature range 209. Where all three are true, in one or more embodiments, the object is authenticated 210 as the user 201 authorized to use the electronic device 100.

In one or more embodiments, when the authentication 210 fails, for whatever reason, the one or more processors (102) can lock or limit full access the electronic device 100 to preclude access to it or the information stored therein. For example, if the at least one image 202 fails to sufficiently correspond to at least one of the one or more predefined reference images 203 the one or more processors (102) can lock the electronic device 100 to preclude access to it or reduce access or the information stored therein. Similarly, if the at least one depth scan 204 fails to correspond to at least one of the one or more predefined facial maps 206, the one or more processors (102) can lock the electronic device 100 to preclude access to it or the information stored therein. If a mask is being used to spoof the authentication system 115, and the amount of thermal energy 207 received from the object fails to fall within the predefined temperature range 209, the one or more processors (102) can lock the electronic device 100 to preclude access to it or the information stored therein. When the electronic device 100 is locked, the one or more processors (102) may then require additional authentication factors beyond the image 202, the depth scan 204, and the amount of thermal energy 207 to authenticate the user 201 at the next authentication cycle.

In the illustrative embodiment of FIG. 2, the user 201 is consuming content 211.

Specifically, the user 201 is viewing a picture of his dog. While the content 211 is an image in this example, it could be other forms of media as well, including music, movies, videos, electronic books, websites, social media sites, and so forth. As used herein, "consuming" content means experiencing that content. For a photograph, this would include viewing the photograph. For a video, this would include viewing the video. For an electronic book, this would include reading the electronic book. For music, this would include listening to the music, and so forth.

In one or more embodiments, the one or more processors (102) of the electronic device 100 can maintain a historical log of the content 211 consumed by the user 201 at step 212. This log can include the frequency with which the user 201 has consumed the content 211, the duration the user 201 has consumed the content 211, the time of day the user 201 has consumed the content 211, and so forth. For content having a temporal component, e.g., a video, song, or electronic book, this log can include how much or what percentage of the content 211 is consumed. For example, if the content 211 had been a 200-page electronic book and the user 201 had read to one hundredth page, the log can include the fact that the user 201 has consumed about fifty percent of the content. Other information to keep within the log will be obvious to those of ordinary skill in the art having the benefit of this disclosure.

The one or more processors (102) can further maintain a log of content preferences at step 213. If, for example, the user 201 prefers audio books over electronic books in text form, this can be logged. If the user 201 prefers to watch videos at a lower resolution than the maximum possible to conserve data usage, this can be logged as well. Other information to keep within the log will be obvious to those of ordinary skill in the art having the benefit of this disclosure.

The one or more processors (102) can also maintain a consumption context at step 214. The consumption context can include information such as the locations at which the user 201 has consumed the content 211. The consumption context can also include preferred conduits for consuming the content 211. If, for example, a user 201 has a preference of watching streaming video in a particular content delivery application, this can be recorded and logged at step 214.

Other information to keep within the log will be obvious to those of ordinary skill in the art having the benefit of this disclosure.

Figure 3:
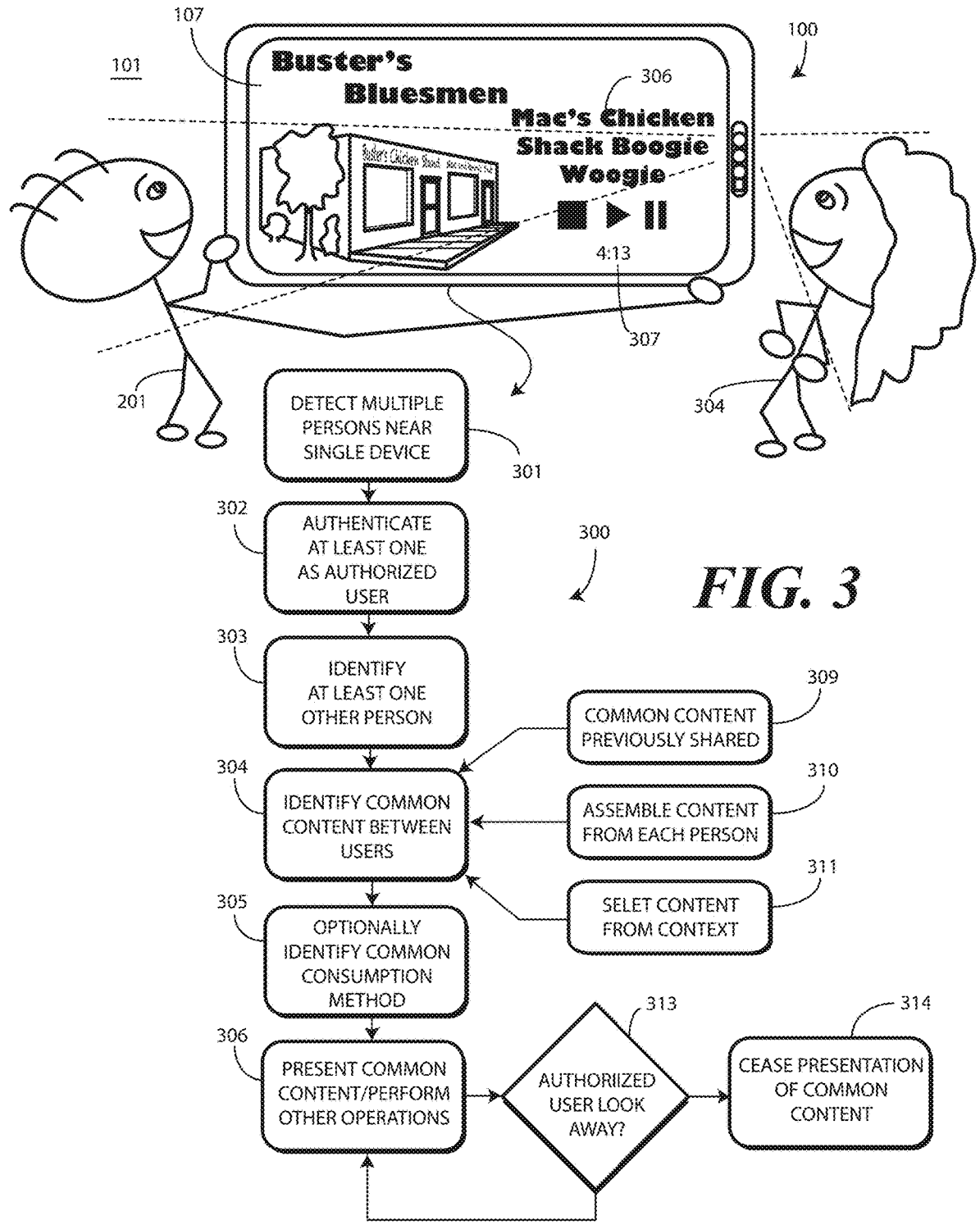
FIG. 3 illustrates one or more method steps in accordance with one or more embodiments of the disclosure.

Turning now to FIG. 3, illustrated therein is an electronic device 100 configured in accordance with one or more embodiments of the disclosure. Also illustrated in FIG. 3 is one explanatory method 300 suitable for use with the electronic device 100 in accordance with one or more embodiments of the disclosure.

Beginning at step 301, the method 300 detects multiple people being within an environment 101 of the electronic device 100. This step 301 can occur in a variety of ways. The imager (119) of the electronic device 100 can capture images of the persons. The depth scanner (120) can capture depth scans of the persons. The thermal sensor (121) can detect the body heat of the persons. Proximity detectors can detect the presence of the persons, and so forth. Other techniques for determining multiple people are positioned in the environment of the electronic device 100 will be obvious to those of ordinary skill in the art having the benefit of this disclosure.

At step 302, the method 300 identifies, with one or more sensors of the electronic device 100, that one person, e.g., user 201, is an authorized user of the electronic device 100, and is present within the environment 101 of the electronic device 100. The procedure described above with reference to FIG. 2 can be used at step 302.

At step 303, the method 300 also identifies, with the one or more sensors of the electronic device 100, at least one other person 304 also being present within the environment 101 of the electronic device 100. Again, one or more of the steps described above with reference to FIG. 2 can be used. To wit, when the imager (119) captures one or more images of the environment 101 of the electronic device 100, and that environment 101 comprises the at least one other person 304, optical recognition performed by the authentication system (115) operating in conjunction with the face analyzer (123) and/or environmental analyzer (124) allows for the identification of any person who has corresponding identifying characteristics stored with the image or depth scan data in the memory (108). Thus, where two, three, four, or more persons are within the environment 101 of the electronic device 100, the optical recognition performed by the authentication system (115) operating in conjunction with the face analyzer (123) and/or environmental analyzer (124) may identify one as an authorized user of the electronic device 100, one as a friend of the authorized user, one as a spouse of the authorized user, one as a cousin of the authorized user, and so forth.

At step 305, in response to identifying an authorized user 201 of the electronic device 100 being present within an environment 101 of the electronic device 100 at step 302, and also identifying at least one other person 304 being present within the environment 101 of the electronic device 100 at step 303, the method 303 selects, with one or more processors (102) of the electronic device 100, content 306 previously consumed by the authorized user 201 and the at least one other person 304 at step 305. In this illustration, the content 306 is the song Mac's Chicken Shack Boogie Woogie by the immortal Buster's Bluesmen. The authorized user 201 and the at least one other person 304 were listening to the song the night before, when they stopped it to eat dinner Upon identifying the other person 304 being within the environment 101 of the electronic device 100, step 305 selects this content.

In one or more embodiments, step 305 also determines a bookmark, identified as a temporal location 307, where the authorized user 201 and the other person 304 ceased consumption of the content 306 previously. Accordingly, in one or more embodiments, the presentation of the content 306 occurring at step 308 comprises initiating the presentation of the content 306 at a temporal location 307 where previous partial consumption of the content 306 by the authorized user 201 and the at least one other person 304 ceased.

At step 308, the method 300 presents, with the one or more processors (102) of the electronic device 100, the content 306 on the display 107 of the electronic device 100. This causes the content (211) the authorized user 201 had previously been consuming above with reference to FIG. 2 to transition to the content 306 previously partially consumed by the authorized user 201 and the at least one other person 304 as shown in FIG. 3.

The content 306 selected at step 305 can take a variety of forms. In one embodiment, the content 306 is content 309 that was previously shared by the authorized user 201 and the at least one other person 304. An example of this is music, e.g., the song Mac's Chicken Shack Boogie Woogie by the immortal Buster's Bluesmen. Both authorized user 201 and the at least one other person 304 were previously listening to the tune, which means they were both sharing or experiencing the content 306 together. Such content 309 can include pictures, videos, electronic books, websites, social media sites, and so forth.

In another embodiment, the content 310 is assembled from each person as collective content. Illustrating by example, rather than being content 309 that was previously shared by the authorized user 201 and the at least one other person 304, the content 310 may be compiled from each person. Using music as an example, the content 310 may include some of the favorite songs of the authorized user 201 and some other songs that happen to be favorites of the at least one other person 304.

For instance, where the content 310 is collective content such as music, embodiments of the disclosure are advantageously operable to create playlists from various devices. In one embodiment, when one or more sensors (103) of the electronic device 100 identify an authorized user 201 of the electronic device 100 within an environment 101 of the electronic device 100, a music player application can begin playing a combination of the authorized user's favorite songs. When at least one other person 304 is identified by the one or more sensors (103) as being present within the environment 101 of the electronic device 100, the one or more processors (102) can select additional content from another device, such as the device belonging to the at least one other person 304, and can compile or collect those songs with the authorized user's favorite songs. In one embodiment, the one or more processors (102) may append the playlist of the authorized user 201 with favorite songs of the other person 304, thereby creating a new playlist. This can be expanded as additional people enter the environment 101 about the electronic device 100. In a party situation, for example, as each new guest arrives her party mixes can be amended into the cumulative, collective playlist.

In still another embodiment, rather than pulling content 310 associated with each person, or content previously partially consumed by the authorized user 201 and the at least one other person 304, content 311 can be selected based upon various contextual factors. Consider, for example, the situation where the authorized user 201 and the at least one other person 304 had been watching a television show the night prior, but had finished it. In such a situation, step 305 may select the next episode in one embodiment. If the authorized user 201 and the at least one other person 304 had finished the series, step 305 may include selecting a new, similar series. The series may be similar in that it is of the same genre, includes the same actors, or is "liked" by many people who like the series just finished.

In situations where the temporal location 307 was near the end of the content 306, and the current session between the authorized user 201 and the at least one other person 304 included completing consumption of the content 306, e.g., hearing the end of the song, step 305 can include selecting additional content 311 as a function of the previously completed content 306. For example, if Mac's Chicken Shack Boogie Woogie were track one of the album Kayla Eats Here, step 305 may include selecting track two, Emma and Tommy Play, as a function of completing Mac's Chicken Shack Boogie Woogie. Accordingly, in one embodiment, upon completing the presenting of the content 306 on the display 107 of the electronic device 100, step 305 can include suggesting, with the one or more processors (102) of the electronic device 100, additional content 311 as a function of the content 306.

In one or more embodiments step 305 includes, either using the one or more processors (102) of the electronic device 100, or alternatively in cooperation with a remote electronic device, such as a server across the "cloud," accessing a history of content the at least one authorized user 201 of the electronic device 100 and the at least one other person 304 consume together. It is noted that this history can be quite different from listings of content the at least one authorized user 201 of the electronic device 100 and the at least one other person 304 consume separately. From such a history, step 305 can include selecting content 311 based upon contextual factors.

Optional step 312 can include selecting a content delivery application for the content selected at step 305. In one embodiment, the content delivery application is selected from a plurality of content delivery applications at step 312. In one or more embodiments, the selection at step 312 occurs as a function of a previously used content delivery application upon which the content was previously partially consumed.

As noted above, in one or more embodiments not only does the method 300 select, at step 305, content 306 previously partially consumed by the authorized user 201 and the at least one other person 304, embodiments of the disclosure can further change how the content is being presented or consumed by selecting a content delivery application at step 312. Said differently, in one or more embodiments step 312 can include selecting a content delivery application for the content from a plurality of content delivery applications as a function of a previously used content delivery application upon which the content was previously partially consumed.

Illustrating by example using an electronic book as the content, the authorized user 201 may prefer to listen to the electronic book as an audio book. The at least one other person 304 may prefer to read the electronic book on a specialized reader using an electronic ink display. However, each of these content delivery applications may be unsuitable for group use. For example, the at least one other person 304 may be irritated by the audio book narrator's voice. The specialized reader may be too small for both the authorized user 201 and the at least one other person 304 to see.

Accordingly, in one or more embodiments step 312 selects a content delivery application. If, for instance, the authorized user 201 is listening to the audio book when the at least one other person 304 is not around, and the one or more sensors (103) of the electronic device 100 detect the at least one other person 304 being present within the environment 101 of the electronic device 100, step 312 may select an electronic book reader application for the electronic device 100 and switch to that application from the audio book reader application.

In one or more embodiments, the presentation of common content occurring at step 308 only occurs while the authorized user 201 is present within the environment of the electronic device 100. In one or more embodiments, the presentation of common content occurring at step 308 only occurs while the authorized user 201 is present within the environment of the electronic device 100 and is looking at the electronic device 100. Either or both condition can be determined at decision 313. This conditional presentation can protect personal data of the authorized user 201 stored within the electronic device 100. Accordingly, in one or more embodiments step 314 includes ceasing the presentation of content when one or both of the authorized user 201 looks away from the electronic device 100 and/or leaves the environment 101 of the electronic device 100. As such, in one or more embodiments the method 300 continues the presenting of the content on the display, step 308, of the electronic device 100 only when the authorized user 201 of the electronic device 100 is present within the environment 101 of the electronic device 100, and ceases, step 314, presentation of the content when the authorized user 201 of the electronic device 100 is not present within the environment 101 of the electronic device 100 and/or looks away from the electronic device 100.

Figure 4:
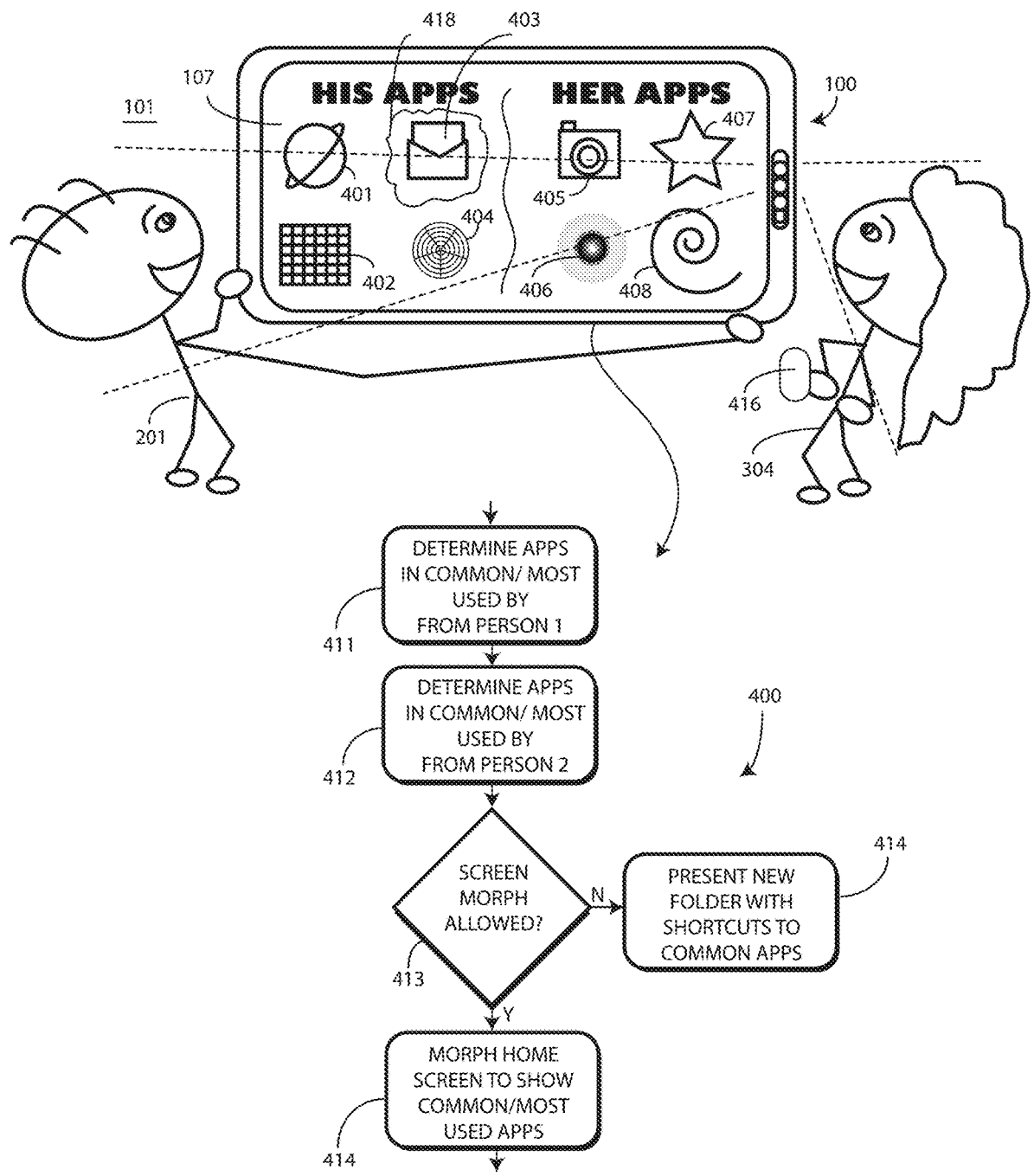
FIG. 4 illustrates one or more method steps in accordance with one or more embodiments of the disclosure.

Now that embodiments of an electronic device (FIG. 1), method steps for identifying and or authenticating persons within an environment of the electronic device (FIG. 2), and a general method of selecting and presenting common content (FIG. 3) have been described, a few examples will serve to better illustrate different embodiments of the disclosure. Turning first to FIG. 4, illustrated therein is one such embodiment.

Illustrated in FIG. 4 is an electronic device 100 configured in accordance with one or more embodiments of the disclosure. In one or more embodiments, the electronic device 100 includes one or more sensors (103) identifying at least one authorized user 201 of the electronic device 100 within an environment 101 of the electronic device 100 and at least one other person 304 within the environment 101 of the electronic device 100. In one or more embodiments, the electronic device 100 also includes a user interface (106) and one or more processors (102), operable with the user interface (106). The one or more processors (102) can retrieve content previously presented on the user interface (106) of the electronic device 100 when both the at least one authorized user 201 of the electronic device 100 and the at least one other person 304 were within the environment 101 of the electronic device 100. The one or more processors (102) can also change a content presentation on the user interface (106) to repeat presentation of the content upon detecting both the at least one authorized user 201 of the electronic device 100 and the at least one other person 304 of the electronic device 100 are within the environment 101 of the electronic device 100.

In one or more embodiments, upon detecting both the at least one authorized user 201 of the electronic device 100 and the at least one other person 304 are within the environment 101 of the electronic device 100, a "home" screen 410 of the electronic device 100 can change so that applications 401,402,403,404,405,406,407,408 commonly used by both the at least one authorized user 201 of the electronic device 100 and the at least one other person 304 are presented. Such is the case in FIG. 4.

One or more steps of a method 409 for doing this are also shown at FIG. 4. These steps can occur after detecting both the at least one authorized user 201 of the electronic device 100 and the at least one other person 304 are within the environment 101 of the electronic device 100 as described above with reference to FIG. 3.

In one or more embodiments, step 411 can include selecting one or more applications 401,402,403,404 that are either noted as preferred by the authorized user 201 in the user settings of the electronic device 100, or are frequently used by the authorized user 201 of the electronic device 100, or that are frequently used by both the authorized user 201 of the electronic device and the at least one other person 304 when both the at least one authorized user 201 of the electronic device 100 and the at least one other person 304 are within the environment 101 of the electronic device 100.

Step 412 can then perform the same operation for the other person 304. Thus, step 412 can include selecting one or more applications 405,406,407,408 that are either noted as preferred by the at least one other person 304 in the user settings of another electronic device 416 belonging to the other person 304, or are frequently used by the other person 304 on the other electronic device 416 of the electronic device 100, or that are frequently used by both the authorized user 201 of the electronic device 416 and the at least one other person 304 when both the at least one authorized user 201 of the electronic device 100 and the at least one other person 304 are within the environment 101 of the other electronic device 416.

As shown in FIG. 4, once these applications 401,402,403, 404,405,406,407,408 are selected, they can be presented on the home screen 410 at step 415. In this illustration, applications 401,402,403,404 are highlighted as "his apps," meaning they are preferred or frequently used by one or both persons as a function of activity primarily by the authorized user 201, while applications 405,406,407,408 are highlighted as "her apps," meaning they are preferred or frequently used by one or both persons as a function of activity primarily by the other person 304.

In one or more embodiments, step 415 can also optionally include highlighting 418 the common content, here illustrated as application 403, when the two or more people are both present within the environment 101 and are looking at the electronic device 100. Advantageously, embodiments of the disclosure provide methods and systems for seamlessly highlighting common content when two or more people are present within an environment 101 of an electronic device 100. Step 415 can optionally highlight 418 the common content when the two or more people are both present within the environment 101 and are looking at the electronic device 100 in some embodiments.

Embodiments of the disclosure contemplate that the authorized user 201 may not want the home screen 410 of the electronic device 100 to change. This preference can be entered in the user settings of the electronic device 100, and the determination of whether the authorized user 201 minds the change or "morph" in the home screen 410 can be made at decision 413. In cases where the authorized user 201 does not want to have their home screen 410 so changed, in one or more embodiments a new folder 417 with shortcuts to applications commonly used by both the at least one authorized user 201 of the electronic device 100 and the at least one other person 304 can appear at step 414.

The new folder 417 defines a user actuation target. Where the display 107 is touch sensitive, the authorized user 201 or the other person 304 can touch the user actuation target to access short cuts for launching a previously used application, which constitutes previously partially consumed content. Accordingly, in one or more embodiments step 414 comprises presenting a user actuation target launching the content previously partially consumed by the authorized user 201 and the at least one other person 304, rather than morphing the home screen 410.

Figure 5:
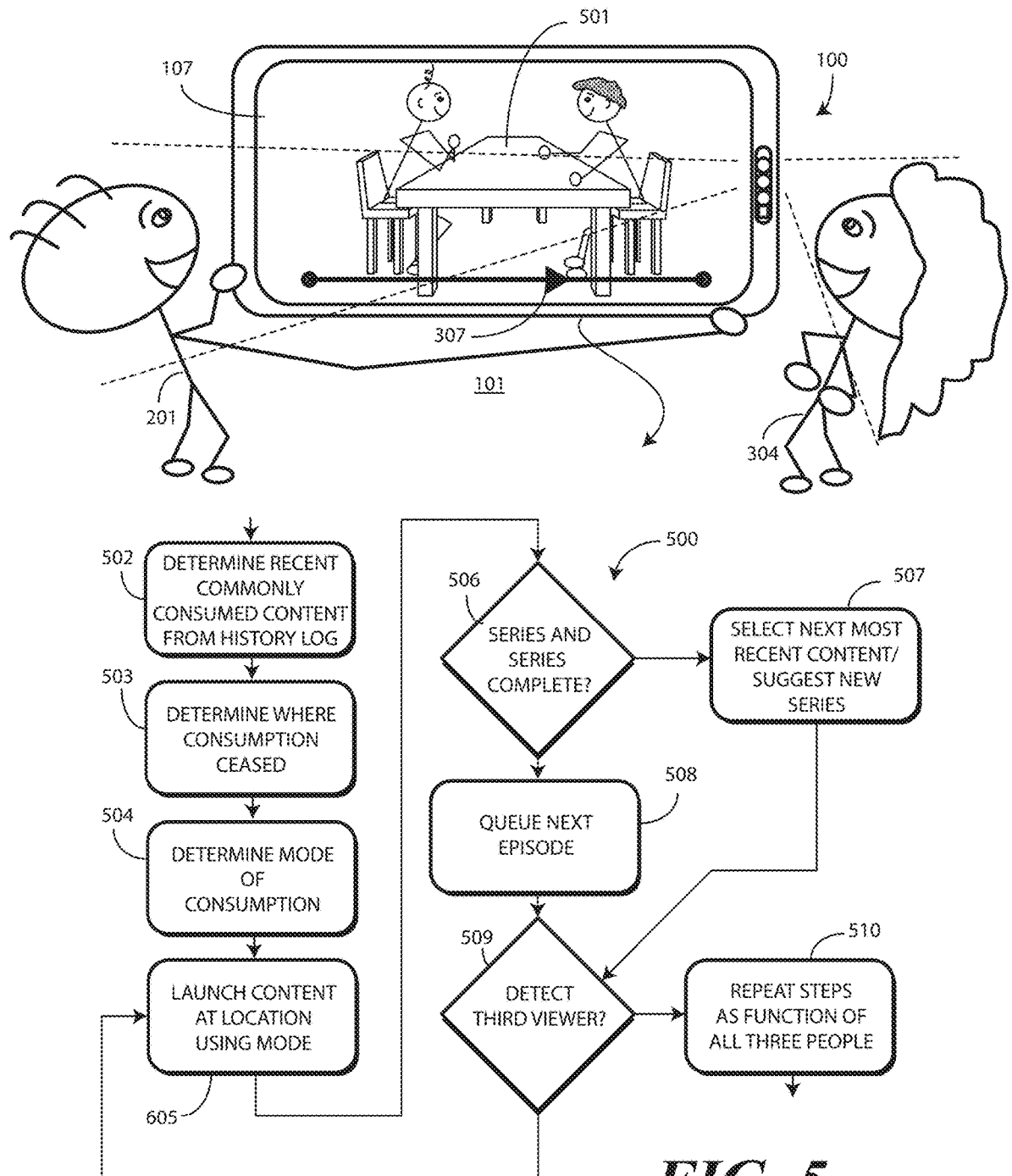
FIG. 5 illustrates one or more method steps in accordance with one or more embodiments of the disclosure.

Turning now to FIG. 5, illustrated therein is another embodiment where common content 501 is presented on a display 107 of an electronic device 100 after detecting both the at least one authorized user 201 of the electronic device 100 and the at least one other person 304 are within the environment 101 of the electronic device 100 as described above with reference to FIG. 3. In this illustrative embodiment, the common content 501 comprises a television episode of a serial television program that the authorized user 201 and the other person 304 watch together. As with FIG. 4, one or more steps of a method 500 are shown in FIG. 5 as well.

Beginning at step 502, after detecting both the at least one authorized user 201 of the electronic device 100 and the at least one other person 304 are within the environment 101 of the electronic device 100, the method 500 determines recent commonly consumed content from a history log. The history log can be saved within a memory (108) of the electronic device 100, or in another electronic device such as a server the electronic device 100 is in communication with across a network. Step 502 thus identifies, with one or more processors (102) of the electronic device 100, content 501 previously partially consumed by the authorized user 201 and the at least one other person 304. Since an accurate selection of previously partially consumed content occurs best where the identity of the authorized user 201 and the at least one other person is known, in one embodiment the identifying occurring at step 502 occurs as a function of an identity of the authorized user 201 and another identity of the at least one other person 304.

Other factors, such as time of day can be used at step 502 as well. Step 502 can include detecting a time stamp added when the previously consumed content ceased. If, for example, two users had done two common things the day before (one in morning and one in evening), when the electronic device 100 detects both present again the next day in the morning, step 502 can include selecting content from the prior day in the morning. However, when the electronic device 100 detects both people the next day in the evening, step 502 can include selecting content from the prior day in the evening.

In one or more embodiments, step 503 includes determining a temporal location 307 where the previous partial consumption of the content 501 ceased. In the illustration of FIG. 5, it appears that the authorized user 201 and the at least one other person stopped watching the content 501 a little over half-way through.

Optional step 504 includes determining a content delivery application for the content 501. In one or more embodiments, step 504 comprises selecting a content delivery application from a plurality of content delivery applications as a function of a previously used content delivery application upon which the content 501 was previously partially consumed. For instance, in situations where there are multiple ways content may be consumed, e.g., multiple content delivery applications, step 504 can include selecting the content delivery application most recently used to consume the content 501.

If, for example, the authorized user 201 and the other person 304 always use the Gabawaba streaming application to watch this particular show, step 504 can include selecting the Gabawaba streaming application over the Morfndorf streaming application, and so forth. Advantageously, step 504 can select a particular content delivery application as a function of identifying the authorized user 201 and at least one other person 304 being within the environment 101 of the electronic device 100.

In situations where a preferred content delivery application is unavailable for whatever reason, step 504 can select a next best option content delivery application. For instance, if the authorized user 201 and at least one other person 304 usually watch a television program using the Gabawaba streaming application, and the authorized user 201 and at least one other person 304 are traveling and are in a location where the Gabawaba streaming application is unavailable, step 504 can include selecting another content delivery application, e.g., a web browser or other application, to stream the content 501.

Where that content delivery application is not currently active on the display 107 of the electronic device 100, step 505 can include launching the content delivery application. Said differently, step 505 can include switching to the consumption method, i.e., the content delivery application, as a function of the people present in the environment 101 of the electronic device 100. Step 505 can also include initiating the presentation of the content 501 at the temporal location 307 where previous partial consumption of the content 501 by the authorized user 201 and the at least one other person 304 ceased. As noted above, in other embodiments step 505 might start the presentation of the content 501 at a predetermined time prior to the temporal location 307 where previous partial consumption of the content 501 by the authorized user 201 and the at least one other person 304 ceased, such as thirty seconds or one minute, to help remind them of what they were watching.

Embodiments of the disclosure contemplate that the authorized user 201 and the at least one other person 304 may complete the consumption of the content 501, i.e., finish the show, at some point. Decision 506 determines whether the content 501 and/or the corresponding series (where applicable) are complete. Either affirmative or negative determinations of this decision 506 can result in suggesting, at either step 507 or step 508, additional content as a function of the content 501.

For example, where the show is complete and the series is not, step 508 can queue up the next episode of the series as a function of completion of the presenting of the content 501 from step 505. By contrast, where the show and series are complete, step 507 can include selecting a new, similar series as a function of the just completed series. The newly suggested series may be similar in that it is of the same genre, includes the same actors, or is "liked" by many people who like the series just finished.

Embodiments of the disclosure contemplate that the authorized user 201 and the at least one other person 304 may be joined by a third, fourth, fifth, or more person(s) while consuming the content 501. This is determined at decision 509. Embodiments of the disclosure contemplate that the content consumed by a party of three might be different from that consumed by a party of two. If, for example, the third person is the child of the authorized user 201 and the at least one other person 304, the three may consume content that is educational in nature, while the authorized user 201 and the at least one other person 304 consume dramas when the child is not around. Accordingly, in one or more embodiments where decision 509 detects an additional person within the environment 101 of the electronic device 100, step 510 can include repeating steps 502,503,504,505, and 507 or 508 as a function of the three people.

Figure 6:
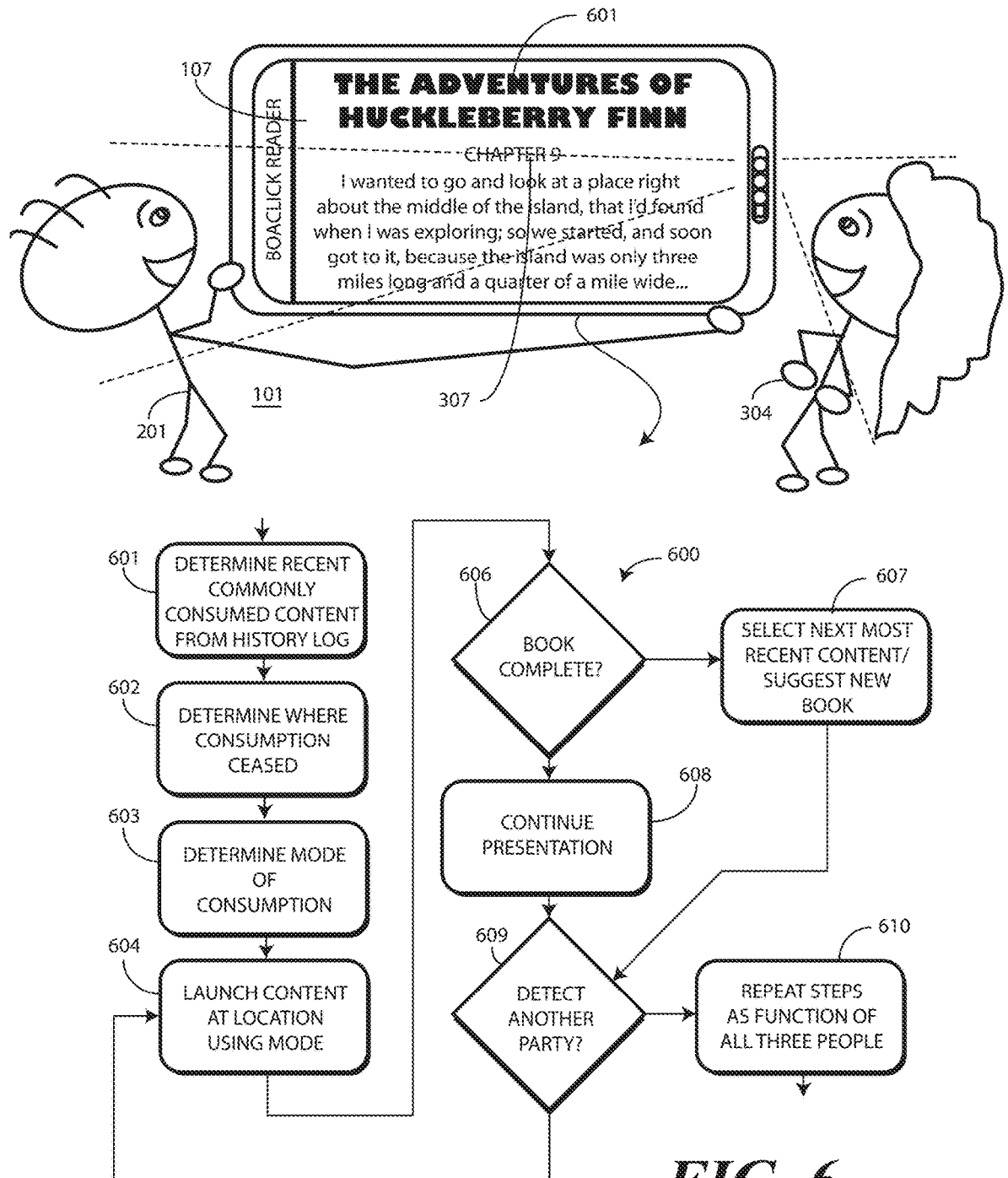
FIG. 6 illustrates one or more method steps in accordance with one or more embodiments of the disclosure.

Turning now to FIG. 6, illustrated therein is another embodiment where common content 601 is presented on a display 107 of an electronic device 100 after detecting both the at least one authorized user 201 of the electronic device 100 and the at least one other person 304 are within the environment 101 of the electronic device 100 as described above with reference to FIG. 3. In this illustrative embodiment, the common content 501 comprises an electronic book that the authorized user 201 and the other person 304 read together. One or more steps of a method 600 are shown in FIG. 6 as well.

Beginning at step 602, after detecting both the at least one authorized user 201 of the electronic device 100 and the at least one other person 304 are within the environment 101 of the electronic device 100, the method 600 determines recent commonly consumed content from a history log. The history log can be saved within a memory (108) of the electronic device 100, or in another electronic device such as a server the electronic device 100 is in communication with across a network. Step 602 thus identifies, with one or more processors (102) of the electronic device 100, content 601 previously partially consumed by the authorized user 201 and the at least one other person 304. Since an accurate selection of previously partially consumed content occurs best where the identity of the authorized user 201 and the at least one other person is known, in one embodiment the identifying occurring at step 602 occurs as a function of an identity of the authorized user 201 and another identity of the at least one other person 304.

In one or more embodiments, step 603 includes determining a temporal location 307 where the previous partial consumption of the content 601 ceased. In the illustration of FIG. 6, it appears that the authorized user 201 and the at least one other person stopped reading the content 601 at the end of chapter eight.

Optional step 604 includes determining a content delivery application for the content 601. In one or more embodiments, step 604 comprises selecting a content delivery application from a plurality of content delivery applications as a function of a previously used content delivery application upon which the content 601 was previously partially consumed. For instance, in situations where there are multiple ways content may be consumed, e.g., multiple content delivery applications, step 604 can include selecting the content delivery application most recently used to consume the content 601 as described above with reference to FIG. 5. The content 601 can then be launched and/or presented at step 605.

Embodiments of the disclosure contemplate that the authorized user 201 and the at least one other person 304 may complete the consumption of the content 601, i.e., finish the book, at some point. Decision 606 determines whether the consumption of the content 601 is complete. Where it is not, the presentation of step 605 can continue at step 608. Where the book is finished, step 608 can suggest additional content as a function of the content 601. For example, step 607 can include selecting a new, similar book as a function of the just completed book. The newly suggested book may be similar in that it is of the same genre, is by the same actor, or is "liked" by many people who like the book just completed.

Embodiments of the disclosure contemplate that the authorized user 201 and the at least one other person 304 may be joined by a third, fourth, fifth, or more person(s)

while consuming the content 601. This is determined at decision 609. In one or more embodiments where decision 609 detects an additional person within the environment 101 of the electronic device 100, step 610 can include repeating steps 602,603,604,605, and 607 or 608 as a function of the three people.

Figure 7:
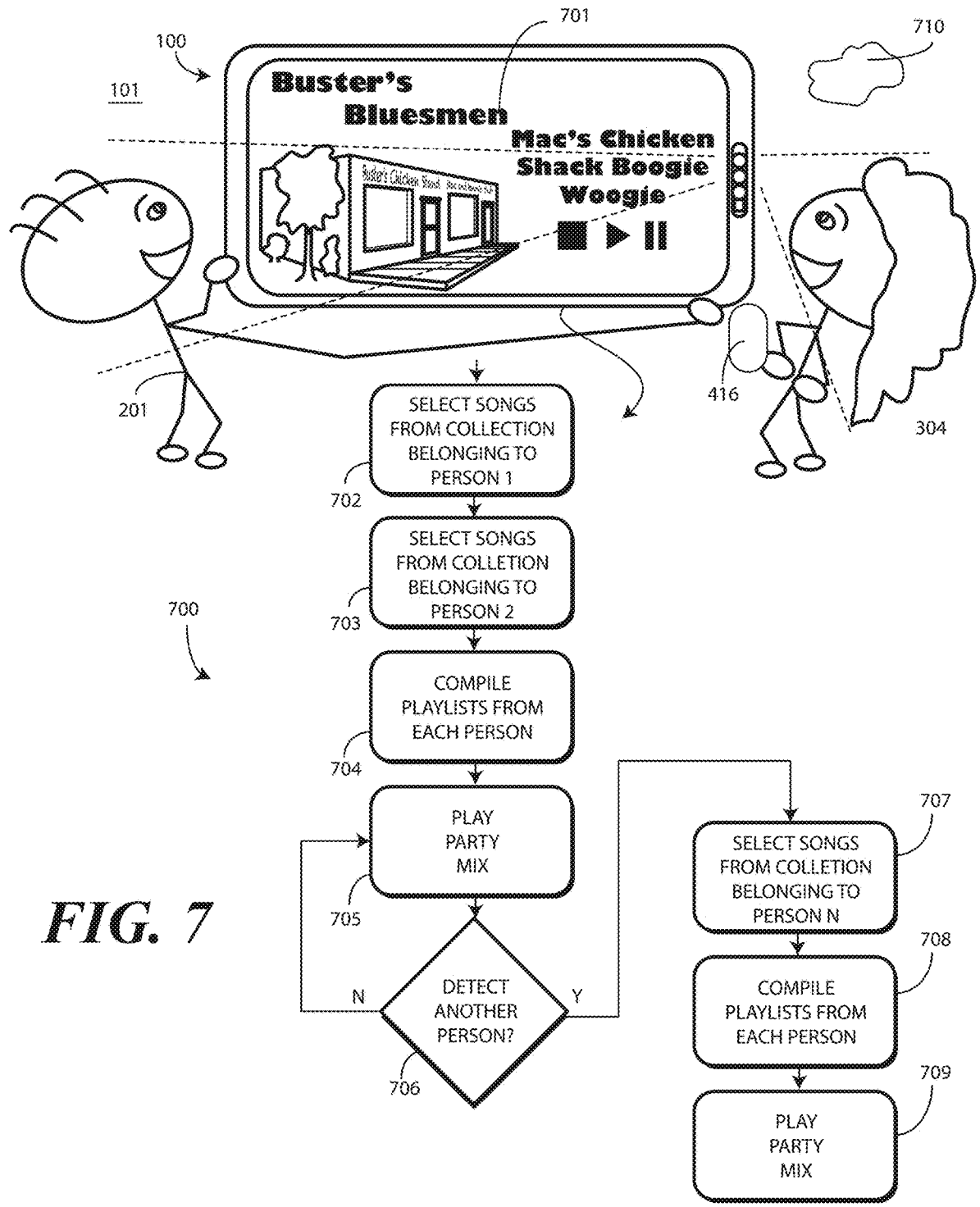
FIG. 7 illustrates one or more method steps in accordance with one or more embodiments of the disclosure.

Turning now to FIG. 7, illustrated therein is an embodiment where common content 701, which is music in this case, is selected from the electronic device 100 belonging to the authorized user 201 and another electronic device 416 belonging to at least one other person 304 for presentation by an audio output device of the electronic device 100 when both the at least one authorized user 201 of the electronic device 100 and the at least one other person 304 are within the environment 101 of the electronic device 100. Where the common content 701 comprises music, the embodiment of FIG. 7 is advantageously operable to create playlists from various devices.

In this illustrative embodiment, the common content 701 is assembled from each person as collective content. Rather than being content that was previously shared by the authorized user 201 and the at least one other person 304, the common content 701 may be compiled from electronic devices belonging each person. Accordingly, the common content 701 can include some of the favorite songs of the authorized user 201 and some other songs that happen to be favorites of the at least one other person 304. The embodiment of FIG. 7 can be applied to other common content as well, including pictures, videos, and so forth.

In one embodiment, upon detecting both the at least one authorized user 201 of the electronic device 100 and the at least one other person 304 are within the environment 101 of the electronic device 100, step 702 comprises the one or more processors (102) of the electronic device 100 retrieving, from a memory (108) of the electronic device or from a remote electronic device across a network, content 807 belonging to the authorized user 201. In this example, this includes selecting favorite, popular, most played, or otherwise songs liked by the authorized user 201 from the electronic device. These songs can be collected and stored as a "party mix" in one embodiment at step 704.

When at least one other person 304 is identified as being present within the environment 101 of the electronic device 100, step 703 can include retrieving, across a network from a remote electronic device, other content belonging to the at least one other person 304, who happens to be an unauthorized user of the electronic device 100 in this example In the illustrative embodiment of FIG. 7, the remote electronic device is an electronic device 416 belonging to the at least one other person 304, and the network is a Wi-Fi network 710. As such, step 703 includes selecting additional songs the electronic device 416 belonging to the at least one other person 304.

Step 704 can then include compiling or collecting those songs with the authorized user's favorite songs to create a new party mix. For instance, step 704 can include appending the playlist of the authorized user 201 with favorite songs of the other person 304, thereby creating a new playlist.

Step 705 can comprise presenting, with one or more processors (102) of the electronic device 100, at least some of the content belonging to the authorized user 201 and at least some of the other content belonging to the at least one other person 304 on an interface, such as an audio output device, of the electronic device 100. Alternatively, step 705 can include delivering the content belonging to the authorized user 201 and at least some of the other content belonging to the at least one other person 304 to another electronic device, such as a wireless loudspeaker. In either case, in this example step 705 includes playing the party mix. Where the content belonging to the authorized user 201 is interspersed with the content belonging to the at least one other person 304, step 705 can include alternating a presentation of the at least some of the content belonging to the authorized user 201 of the electronic device 100 and the at least some of the other content belonging to the at least one other person 304 on the interface of the electronic device 100, with a wireless loudspeaker, or with other audio output devices.

This method 700 can be expanded as additional people enter the environment 101 about the electronic device 100. In a party situation, for example, as each new guest arrives, as determined at decision 706, her songs, selected at step 707, can be amended into the cumulative, collective playlist at step 708. This can repeat for each guest, with the new party mix being played at step 709.

Figure 8:
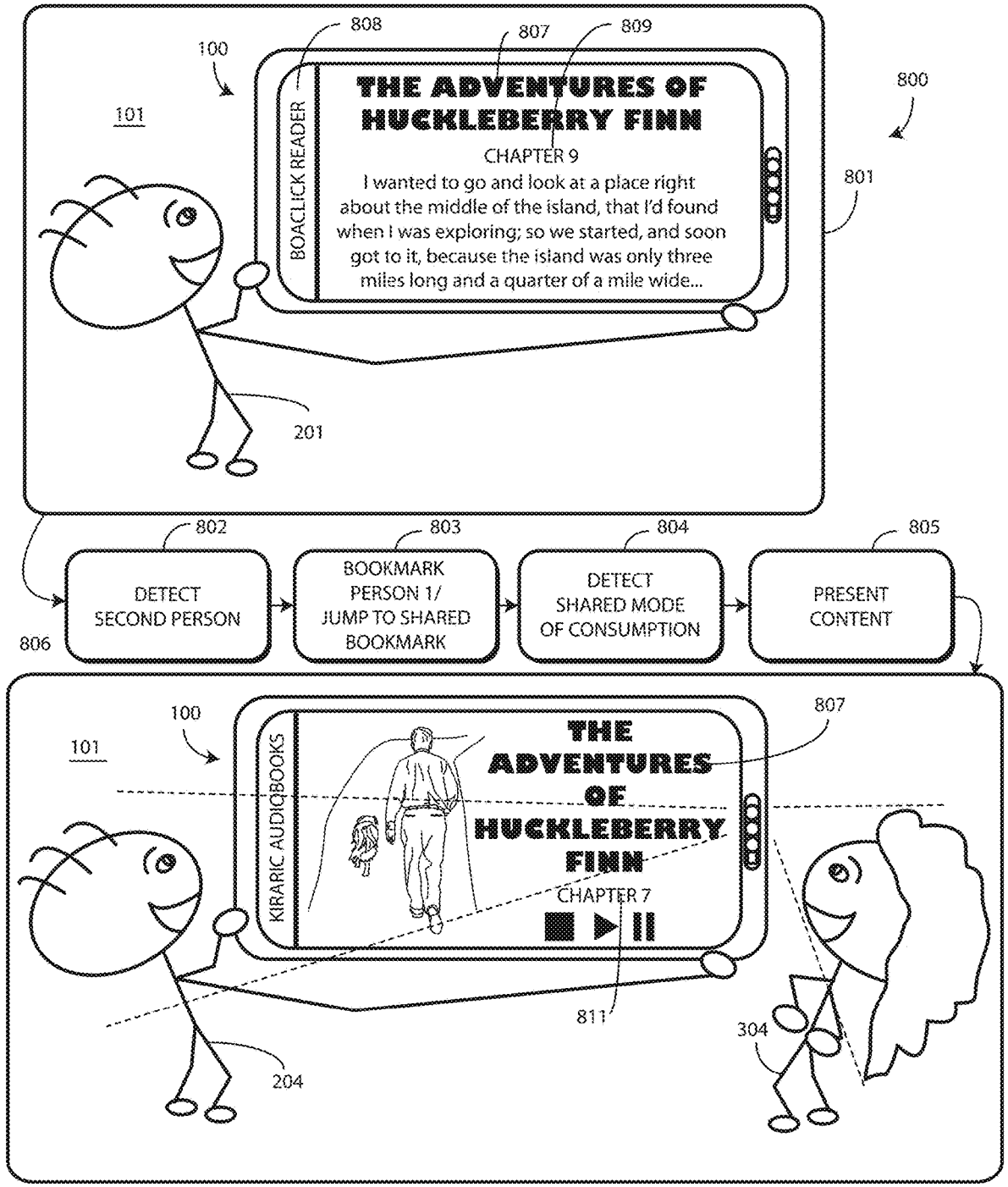
FIG. 8 illustrates one or more method steps in accordance with one or more embodiments of the disclosure.

Turning now to FIG. 8, illustrated therein is another method 800. The method 800 of FIG. 8 illustrates the selection of content delivery application, bookmarking, and other features advantageously offered by embodiments of the disclosure.

Beginning at step 801, the method 800 identifies, with one or more sensors (103) of the electronic device 100, that the authorized user 201 of the electronic device 100 is present within an environment 101 of the electronic device 100. Accordingly, the one or more processors (102) of the electronic device 100 retrieve, from a memory (108) of the electronic device or from a remote electronic device across a network, content 807 belonging to the authorized user 201.

In this example, the authorized user 201 of the electronic device 100 is consuming the content 807 by reading. The content 807 of this example is the electronic book "The Adventures of Huckleberry Finn." The authorized user 201 prefers reading the text of the electronic book to other ways of consuming the content 807. Accordingly, the authorized user 201 has launched a content delivery application 808, which in this case is the Boaclick Reader electronic book reader application. The authorized user 201 has consumed the first eight chapters of the content 807, and is now at chapter nine.

At step 802, the method 800 also identifies, with the one or more sensors (103) of the electronic device 100, at least one other person 304 also being present within the environment 101 of the electronic device 100. In this illustration, the other person 304 happens to be reading The Adventures of Huckleberry Finn as well. In fact, she is reading it with the authorized user 201. However, whenever the at least one other person 304 and the authorized user 201 consume the book together, they like to listen to it as an audio book so they can do other activities, such as cooking dinner, while they listen.

To accommodate this routine preference, embodiments of the disclosure can advantageously change a content presentation on the user interface (106), here switch from electronic book to audio book, to repeat presentation of the content 807, here presenting the audio book as shown in step 806, upon detecting both the at least one authorized user 201 of the electronic device 100 and the at least one other person 304 are within the environment 101 of the electronic device 100.

Prior to doing so, however, in one or more embodiments at step 803 the location at which the authorized user 201 is reading, here chapter nine, is book marked. Said differently, when the presenting of step 806 occurs during another presentation of the content 807, such as in step 801, step 803 can comprise saving, in a memory (108) of the electronic device 100, a temporal location 809 of the another presentation of step 801 prior to presenting the content 807 at step 806. In effect, step 803 bookmarks the content 807 so that the authorized user 201 can come back to it later where he stopped reading.

Step 804 comprises selecting a content delivery application 810 for the content 807 from a plurality of content delivery applications as a function of a previously used content delivery application 810 upon which the content 807 was previously partially consumed when the authorized user 201 and the at least one other person 304 were together. In this example, the one or more processors (102) of the electronic device 100 select the Kiraric Audiobooks application as the new content delivery application to play the content 807 as an audio book.

At step 805, the content 807 is presented. Accordingly, the authorized user 201 and the at least one other person 304 can enjoy the content 807 together. Step 805 thus comprises the one or more processors (102) changing the content presentation by transitioning from a first content delivery application 808 for the content 807 to a second content delivery application 810 for the content 807.

In this example the authorized user 201 and the at least one other person 304 were at a different temporal location 811 than was the authorized user 201 alone. Accordingly, so that the other person 304 does not miss anything, step 805 can include initiating, with the one or more processors (102), the presentation of the content 807 at step 806 at another temporal location 811 where previous partial consumption of the content 807 by the authorized user 201 and the at least one other person 304 ceased. Said differently, step 805 can include the one or more processors (102) of the electronic device 100 changing the content presentation between step 801 and step 806 by transitioning from a first temporal location 809 within the content 807 to a second temporal location 811 of the content 807.

Figure 9:
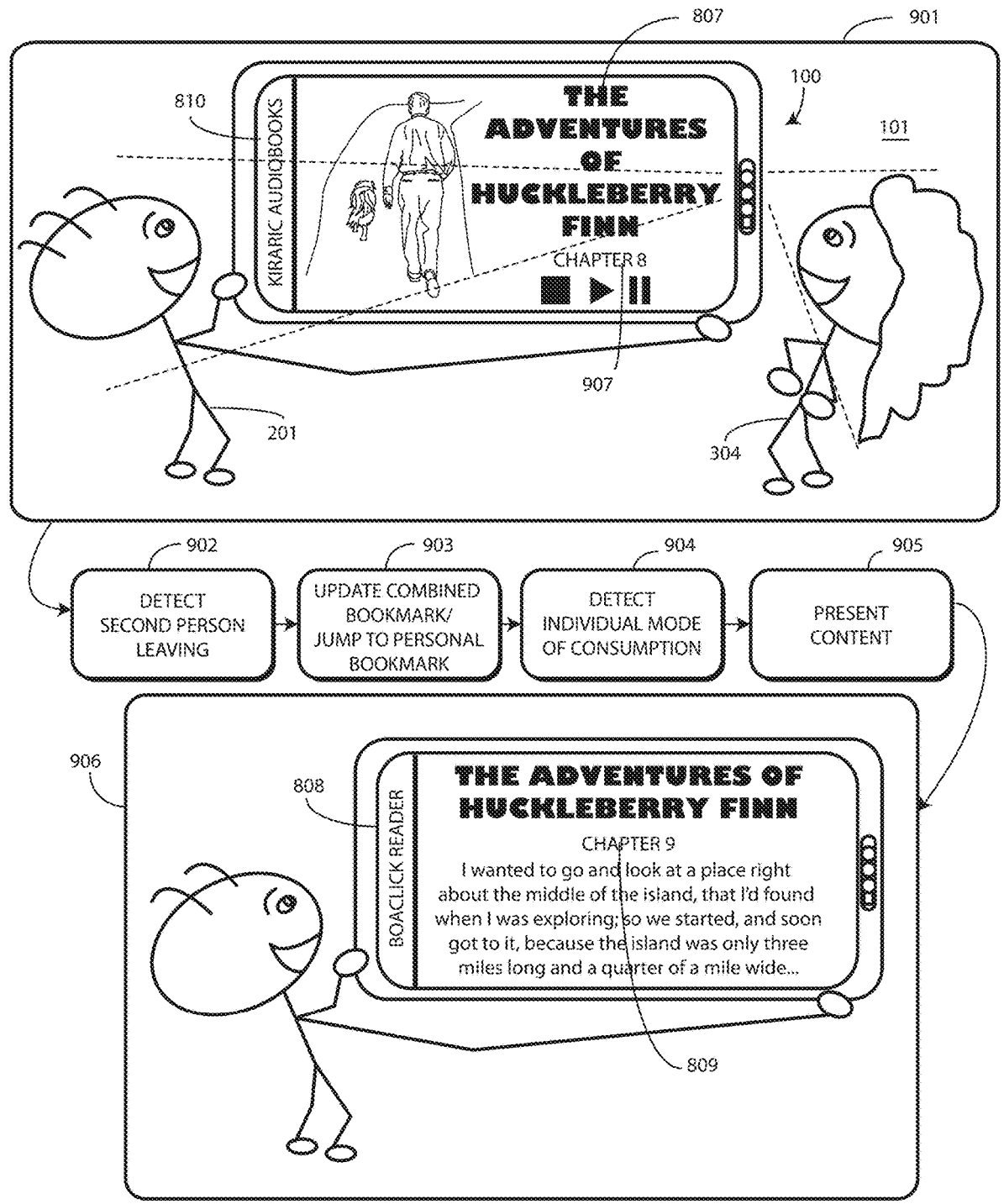
FIG. 9 illustrates one or more method steps in accordance with one or more embodiments of the disclosure.

Turning now to FIG. 9, at step 901 the authorized user 201 and the at least one other person 304 are enjoying the content 807, and have made it to a third temporal location 907, which is chapter eight. However, its time for the at least one other person 304 to leave. Accordingly, at step 902 the method 900 identifies the at least one other person 304 leaving the environment 101 of the electronic device 100.

Prior to doing so, however, in one or more embodiments at step 903 the location at which the authorized user 201 and the at least one other person 304 were listening, here chapter eight, is book marked as previously described. Step 904 comprises selecting a content delivery application 908 for the content 807 from a plurality of content delivery applications as a function of a previously used content delivery application 808 upon which the content 807 was previously partially consumed when the authorized user 201 was alone. Accordingly, the Boaclick Reader electronic book reader application is again selected.

At step 905, the content 807 is presented. Said differently, the one or more processors (102) of the electronic device 100 repeat the presentation of the content 807 that occurred at step (801) of FIG. 8. Accordingly, the authorized user 201 can return to his preferred method of consuming the content 807, which is by reading the text.

In one or more embodiments, step 905 can return to the bookmark set at step (803) of FIG. 8. Said differently, step 905 can include initiating the presentation of the content 807 at step 906 at a temporal location 809 corresponding to a cessation of a previous presentation of the content 807 occurring when the at least one authorized user 201 of the electronic device 100 was alone. Thus, in one embodiment step 905 changes the content presentation between step 901 and step 906 by transitioning from a first temporal location 907 within the content 807 where the authorized user 201 and the at least one other person 304 stopped listening to a second temporal location 809 of the content 807 where the authorized user 201 stopped reading at step (801) of FIG. 8.

Figure 10:
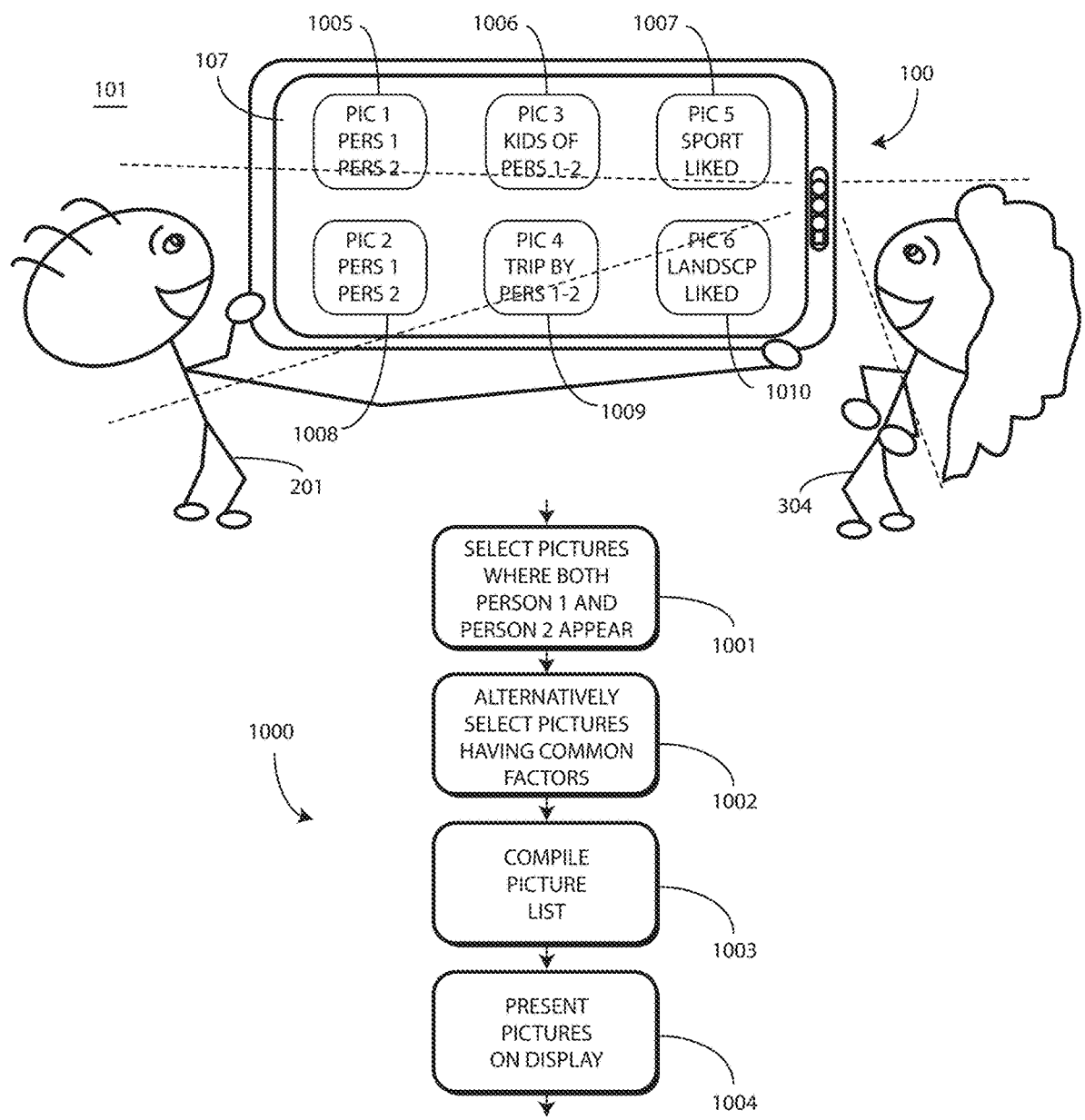
FIG. 10 illustrates one or more method steps in accordance with one or more embodiments of the disclosure.

Turning now to FIG. 10, illustrated therein is another method 1000 in accordance with one or more embodiments of the disclosure. As before, the electronic device 100 identifies at least one authorized user 201 of the electronic device 100 within an environment 101 of the electronic device 100 and at least one other person 304 within the environment 101 of the electronic device 100. The one or more processors (102) can retrieve content previously presented on the user interface (106) of the electronic device 100 when both the at least one authorized user 201 of the electronic device 100 and the at least one other person 304 were within the environment 101 of the electronic device 100. In this illustration, the common content 1005,1006, 1007,1008 comprises pictures. The pictures could instead be videos. Of course, a combination of the two could be used as well.

In one or more embodiments, step 1001 can include selecting one or more common content items belonging to the authorized user 201, as stored in a memory (108) of the electronic device 100. Step 1002 can then perform the same operation for the other person 304. Thus, step 1002 can include selecting common content items that belong to the at least one other person 304, such as images or videos stored in an electronic device 416 belonging to the at least one other person 304.

In this illustration, the common content 1005,1006,1007, 1008 comprises pictures of the authorized user 201 and the at least one other person. In one or more embodiments, the common content 1005,1006,1007,1008 comprises at least some of the content belonging to the authorized user 201 of the electronic device 100 and at least some other content belonging to the at least one other person 304. In this illustration, that common content 1005,1006,1007,1008 comprises depictions of both the authorized user 201 of the electronic device 100 and the at least one other person 304.

Thus, in FIG. 10 upon identifying the authorized user 201 of the electronic device 100 being present within an environment 101 of the electronic device 100, and also identifying at least one other person 304 also being present within the environment 101 of the electronic device 100, the one or more processors (102) can bring to the front or top of the presentation images involving both persons presently situated within the environment 101 of the electronic device 100. Advantageously, when the authorized user 201 and the other person 304 are detected within the environment 101 of the electronic device 100, the one or more processors (102) can cause a photo gallery application, or similar application, to bring to the front and/or top of the display 107 all pictures from, for example, a trip involving the two people.

In another embodiment, when the authorized user 201 and the other person 304 are detected within the environment 101 of the electronic device 100, the one or more processors (102) can cause the photo gallery application to bring to the front and/or top of the display 107 pictures taken together. In still another embodiment, when the authorized user 201 and the other person 304 are detected within the environment 101 of the electronic device 100, the one or more processors (102) can cause the photo gallery application to bring to the front and/or top of the display 107 pictures of people and places the authorized user 201 and other person 304 have in common or share an interest in, such as children, pets, landscapes, and sports.

Figure 11:
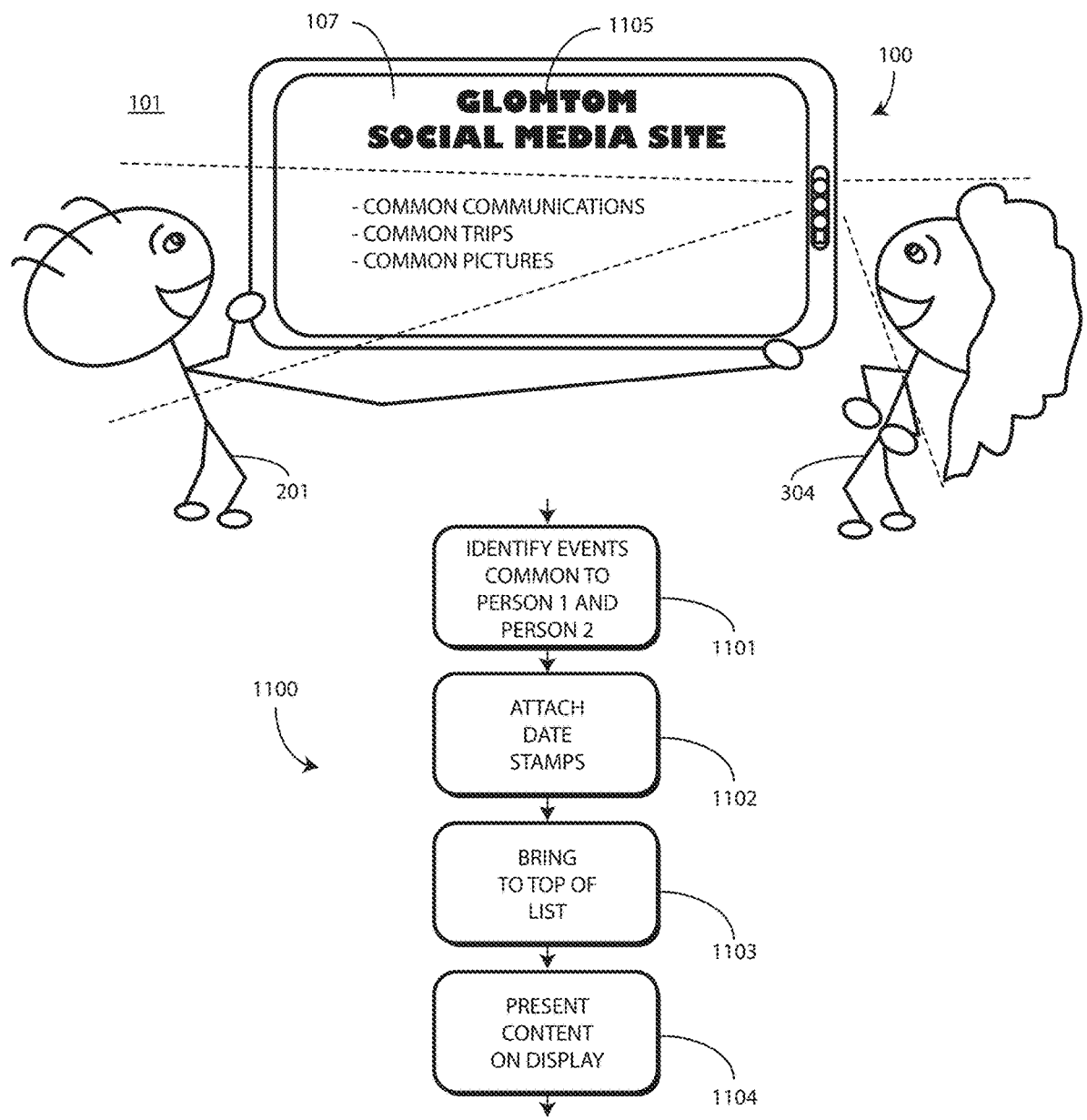
FIG. 11 illustrates one or more method steps in accordance with one or more embodiments of the disclosure.

Turning now to FIG. 11, illustrated therein is yet another method 1100 in accordance with one or more embodiments of the disclosure. As before, the electronic device 100 identifies at least one authorized user 201 of the electronic device 100 within an environment 101 of the electronic device 100 and at least one other person 304 within the environment 101 of the electronic device 100. The one or more processors (102) can retrieve content previously presented content 1105 on the display 107 of the electronic device 100 when both the at least one authorized user 201 of the electronic device 100 and the at least one other person 304 were within the environment 101 of the electronic device 100. In this illustration, the common content comprises a social media site.

In one or more embodiments, step 1101 can include selecting one or more common content items belonging to the authorized user 201, as retrieved from the social media site. Step 1101 can then perform the same operation for the other person 304. Thus, step 1101 can include selecting common content items that belong to the at least one other person 304, as retrieved from the social media site. These common content items can include communications between the authorized user 201 and the at least one other person 304, pictures featuring interactions between the authorized user 201 and the at least one other person 304, or other social media items. Thus, in one or more embodiments the common content items comprise visual representations of electronic communications between the authorized user 201 and the at least one unauthorized user 201. Step 1102 can optionally apply date stamps to the common content. Step 1104 comprises presenting the common content on the display 107. Step 1104 can also include recording, in a common log, presence/access between various people near device (who was near the device, where the device was, what common content was being consumed, and so forth.

Thus, in FIG. 11 upon identifying the authorized user 201 of the electronic device 100 being present within an environment 101 of the electronic device 100, and also identifying at least one other person 304 also being present within the environment 101 of the electronic device 100, the one or more processors (102) can cause a social media application to bring to the front communications between the authorized user 201 and the other person 304. In another embodiment, when the authorized user 201 and the other person 304 are detected within the environment 101 of the electronic device 100, the one or more processors (102) can cause a social media application to bring to the front pictures featuring interaction between the authorized user 201 and the other person 304. In another embodiment, when the authorized user 201 and the other person 304 are detected within the environment 101 of the electronic device 100, the one or more processors (102) can cause a social media application to bring to the front vacation content between the authorized user 201 and the other person 304. Date stamps can be presented in addition to the content to remind the authorized user 201 and the other person 304 when the content was created.

Figure 12:
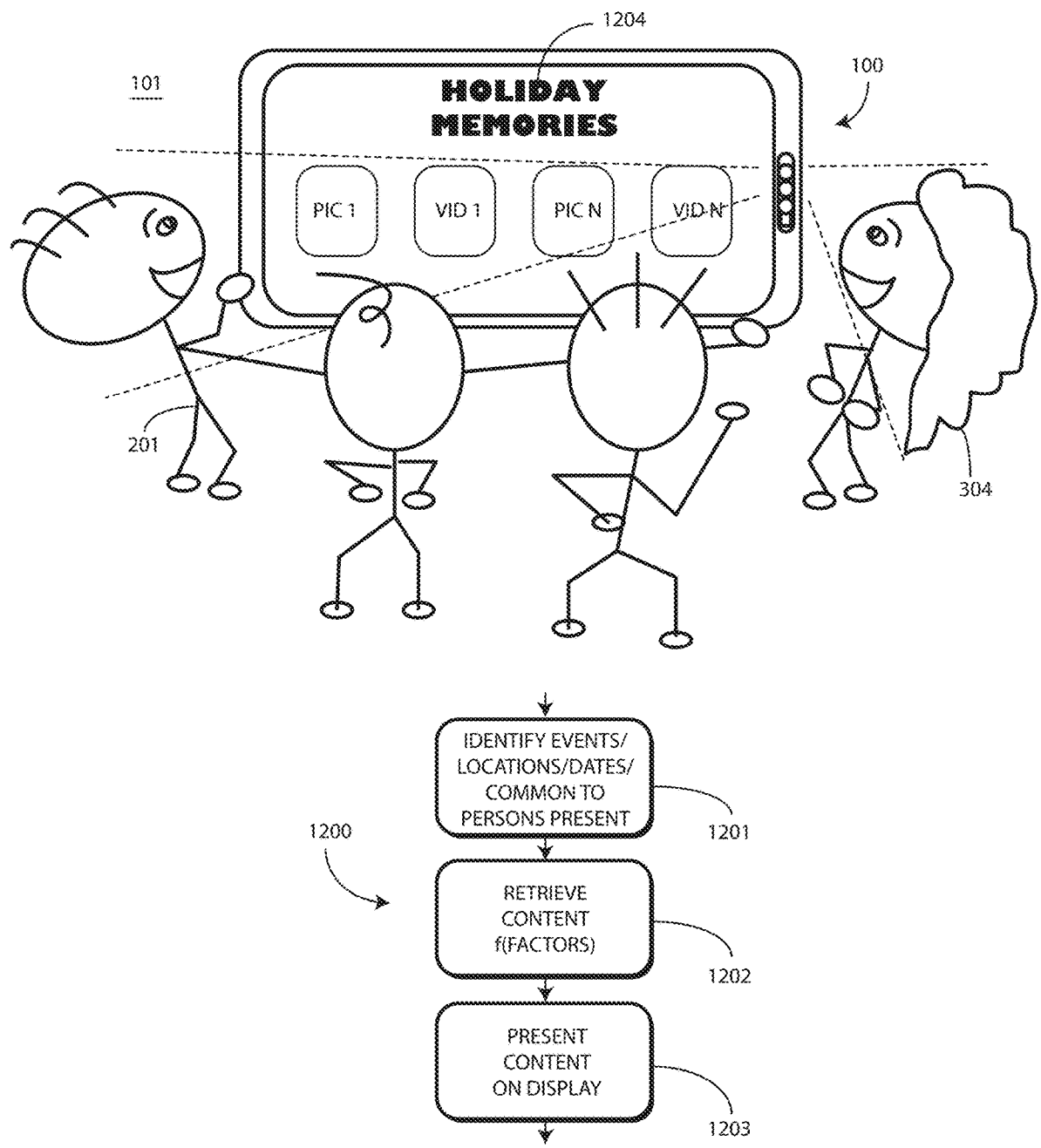
FIG. 12 illustrates one or more method steps in accordance with one or more embodiments of the disclosure.

Turning now to FIG. 12, illustrated therein is yet another method 1200 in accordance with one or more embodiments of the disclosure. As before, the electronic device 100 identifies at least one authorized user 201 of the electronic device 100 within an environment 101 of the electronic device 100 and at least one other person 304 within the environment 101 of the electronic device 100. Here, the electronic device 100 identifies four people, as the authorized user has "gathered the family" around the electronic device 100. The one or more processors (102) can the retrieve content previously presented content on the display 107 of the electronic device 100 when both the at least one authorized user 201 of the electronic device 100 and the at least one other person 304 were within the environment 101 of the electronic device 100. In this illustration, the common content comprises a social media site.

The selection of the content 1204 can be a function of the people gathered about the electronic device 100, as was the case in FIGS. 10-11 above. However, the selection of content 1204 can be a function of other factors, such as a time of day, date, or location. For example, at step 1201 the location detector (116) can determine a location of the electronic device 100. Step 1202 can then retrieve common content, e.g., videos or photographs taken at that particular location. These videos or photographs can be presented at step 1203. The one or more processors (102) can also, at step 1201, determine a time of day or a date. Step 1202 can then retrieve common content, e.g., videos or photographs taken at that particular time or date. These videos or photographs can be presented at step 1203. It should be noted that if the common content selected had inadvertently been deleted from the electronic device 100, but was on the electronic device of another person, in one or more embodiments the content is automatically reinstalled, thereby restoring any lost content.

Illustrating by example, for anniversaries and holidays, the authorized user 201 of the electronic device 100 can gather one or more other persons around the electronic device 100. As these other personas are identified as being within the environment 101 of the electronic device 100, common content can be retrieved at step 1202 as a function of one or more factors and presented on the display at step 1203. For instance, on Christmas day an authorized user 201 can gather the family around an electronic device 100 to revisit, recollect, and remember everything the family did together ever Christmas by bringing that common content on the display 107. Thus, the family can review combined common content on a basis recurring annually at certain anniversary dates, and holidays. Embodiments of the disclosure can also use location in place of calendar date to retrieve common content for presentation on the display.

Figure 13:
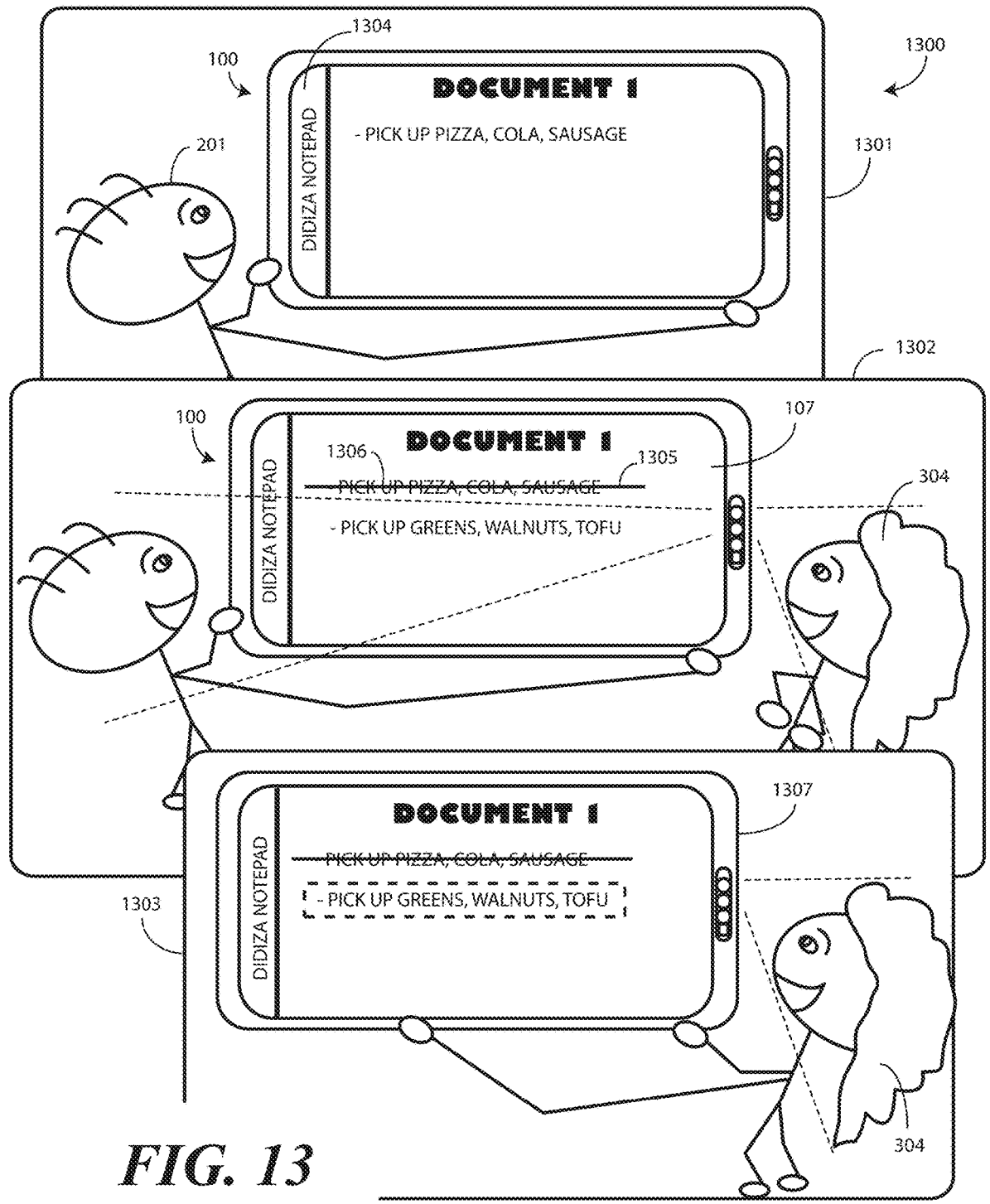
FIG. 13 illustrates one or more method steps in accordance with one or more embodiments of the disclosure.

Embodiments of the disclosure can even be used for collaboration. Turning now to FIG. 13, illustrated therein is yet another method 1300 in accordance with one or more embodiments of the disclosure. At step 1301, the authorized user 201 of the electronic device 100 is making notes in a content delivery application 1304, which is the Didiza notepad application. Specifically, the authorized user 201 is making a grocery list that includes tasty, but less than health, items such as pizza, cola, and sausage.

At step 1302, the electronic device 100 identifies the presence of at least one other person 304. This other person 304 happens to be his wife, who does not approve of these unhealthy items. She thus makes edits to the list. Accordingly, a user interface (106) of the electronic device 100, which is the display 107 in this embodiment, receives the one or more edits 1305 to the content 1306 previously partially created and consumed by the authorized user 201 at step 1301.

Since the wife is going to the grocery store, between step 1302 and step 1303 the electronic device 100 belonging to the authorized user 201 automatically transmits, with a wireless communication circuit (109) of the electronic device 100, the one or more edits 1305 to a remote electronic device 1307 belonging to the at least one other person 304. To show these edits were made, in one embodiment step 1303 includes highlighting the edits as well.

Figure 14:
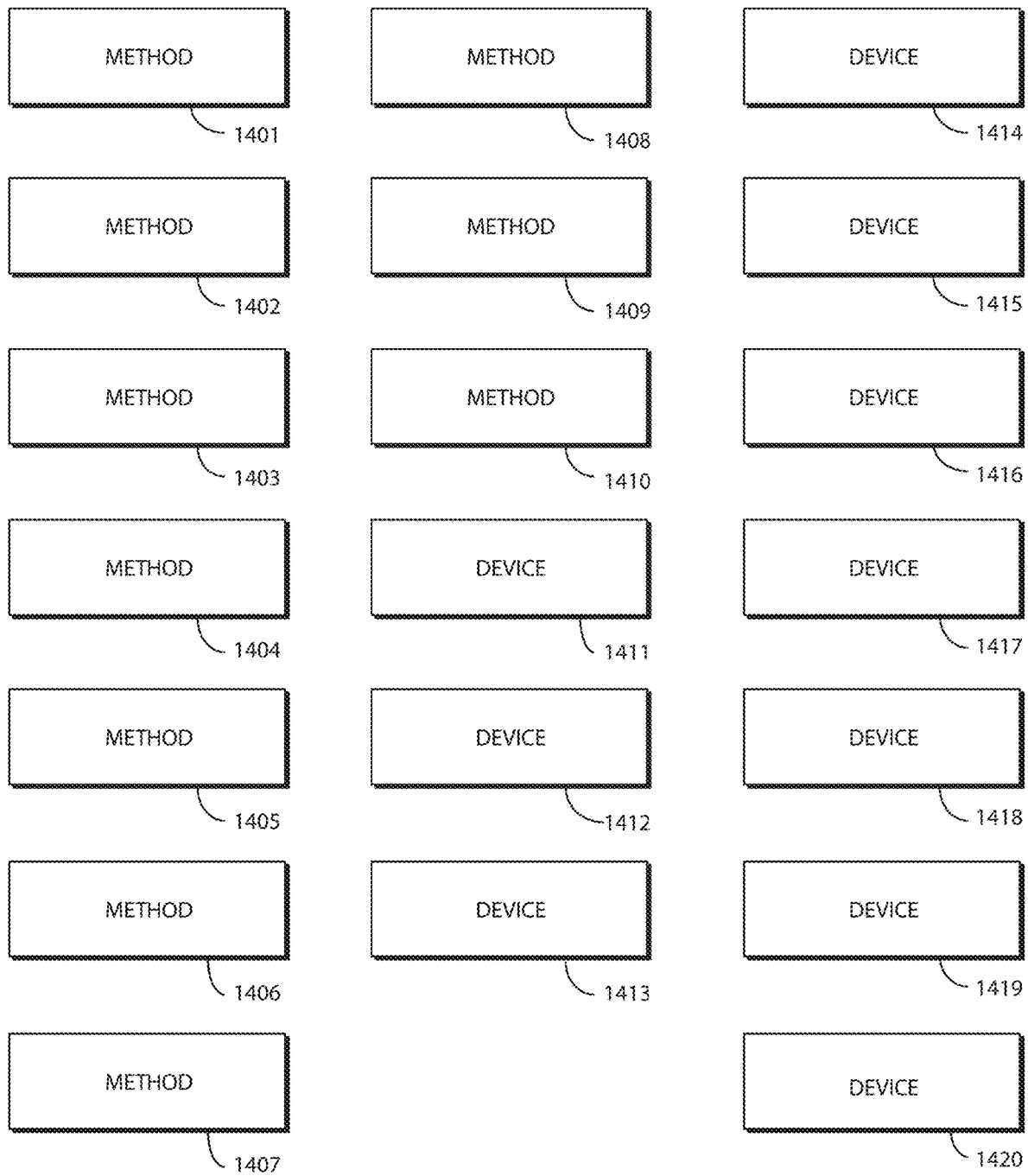
FIG. 14 illustrates one or more embodiments of the disclosure.

Turning now to FIG. 14, illustrated therein are various embodiments of the disclosure. At 1401, a method in an electronic device comprises identifying, with one or more sensors of the electronic device, an authorized user of the electronic device, present within an environment of the electronic device. At 1401, the method comprises also identifying, with the one or more sensors of the electronic device, at least one other person, also present within the environment of the electronic device. At 1401, the method comprises selecting, with one or more processors of the electronic device, content previously partially consumed by the authorized user and the at least one other person. At 1401, the method comprises presenting, with the one or more processors, the content on a display of the electronic device.

At 1402, the method of 1401 further comprises continuing the presenting of the content on the display of the electronic device only when the authorized user of the electronic device is present within the environment of the electronic device. At 1403, the method of 1401 further comprises selecting a content delivery application for the content from a plurality of content delivery applications as a function of a previously used content delivery application upon which the content was previously partially consumed.

At 1404, the presenting of 1401 comprises initiating the presentation of the content at a temporal location where previous partial consumption of the content by the authorized user and the at least one unauthorized user ceased. At 1405, the method of 1404 further comprises completing the presenting of the content on the display of the electronic device and suggesting, with the one or more processors, additional content as a function of the content.

At 1406, the presenting of 1401 occurs during another presentation of the content. At 1406, the method further comprises saving, in a memory of the electronic device, a temporal location of the other presentation where the presenting occurs. At 1407, the method of 1406 further comprises initiating, with the one or more processors, the presentation of the content at another temporal location where previous partial consumption of the content by the authorized user and the at least one other person ceased.

At 1408, the presenting of 1401 occurs concurrently with another presentation of other content. At 1408 the presenting of 1401 further comprises highlighting the content previously partially consumed by the authorized user and the at least one other person to identify the content previously partially consumed by the authorized user and the at least one other person as previously consumed content.

At 1409, the presenting of 1401 comprises presenting a user actuation target launching the content previously partially consumed by the authorized user and the at least one unauthorized user. At 1410 the method of 1410 further comprises identifying, with the one or more processors, the content previously partially consumed by the authorized user and the at least one unauthorized user. At 1410, the identifying occurs as a function of an identity of the authorized user and another identity of the at least one other person.

At 1411, the method of 1401 further comprises receiving, at a user interface of the electronic device, one or more edits to the content previously partially consumed by the authorized user and the at least one other person. At 1411 the method of 1401 further comprises transmitting, with a wireless communication circuit of the electronic device, the one or more edits to a remote electronic device belonging to the at least one other person.

At 1412, an electronic device comprises one or more sensors identifying at least one authorized user of the electronic device within an environment of the electronic device and at least one other person within the environment of the electronic device. At 1412, the electronic device comprises a user interface. At 1412, the electronic device comprises one or more processors, operable with the user interface and retrieving content previously presented on the user interface of the electronic device when both the at least one authorized user of the electronic device and the at least one other person were within the environment of the electronic device. At 1412, the one or more processors change a content presentation on the user interface to repeat presentation of the content upon detecting both the at least one authorized user of the electronic device and the at least one other person are within the environment of the electronic device.

At 1413, the one or more processors of 1412 change the content presentation by transitioning from a first temporal location within the content to a second temporal location of the content. At 1414, the one or more processors of 1413 further transition from the second temporal location of the content to the first temporal location of the content upon the one or more sensors identifying the at least one other person leaving the environment of the electronic device.

At 1415, the one or more processors of 1412 change the content presentation by transitioning from a first content delivery application for the content to a second content delivery application for the content. At 1416, the one or more processors of 1412 repeat the presentation of the content by initiating the presentation of the content at a temporal location corresponding to a cessation of a previous presentation of the content occurring the at least one authorized user of the electronic device and the at least one other person were within the environment of the electronic device.

At 1417, a method comprises identifying, with one or more sensors of the electronic device, an authorized user of the electronic device, present within an environment of the electronic device. At 1417, the method also comprises also identifying, with the one or more sensors of the electronic device, at least one unauthorized user of the electronic device, also present within the environment of the electronic device. At 1417, the method comprises retrieving, from a memory of the electronic device, content belonging to the authorized user. At 1417, the method also includes retrieving, across a network from a remote electronic device, other content belonging to the at least one unauthorized user. At 1417, the method includes presenting, with one or more processors of the electronic device, at least some of the content belonging to the authorized user and at least some of the other content belonging to the at least one unauthorized user on an interface of the electronic device.

At 1418, the method of 1417 further comprises alternating a presentation of the at least some of the content belonging to the authorized user of the electronic device and the at least some of the other content belonging to the at least one unauthorized user of the electronic device on the interface of the electronic device. At 1419, at least some of the content belonging to the authorized user of the electronic device and the at least some of the other content belonging to the at least one unauthorized user of the electronic device of 1418 and on the interface of the electronic device each comprise depictions of both the authorized user of the electronic device and the at least one unauthorized user of the electronic device. At 1420 at least some of the content belonging to the authorized user and at least some of the other content belonging to the at least one unauthorized user at 1417 and on the interface of the electronic device comprises visual representations of electronic communications between the authorized user and the at least one unauthorized user.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    identifying, with one or more sensors of the electronic device, an authorized user of the electronic device, present within an environment of the electronic device;
    also identifying, with the one or more sensors of the electronic device, at least one other person, also present within the environment of the electronic device;
    determining, with the one or more sensors of the electronic device, whether the authorized user and the at least one other person are both looking at the electronic device by detecting an alignment of an authorized user head and at least one other person head in three-dimensional space;
    selecting, with one or more processors of the electronic device, content previously partially consumed by the authorized user and the at least one other person; and
    presenting, with the one or more processors, the content on a display of the electronic device in response to detecting that the authorized user and the at least one other person are both looking at the electronic device.

2. The method of claim 1, further comprising confirming, with an authentication system operational on the electronic device, that the authorized user and the at least one other person are actually looking at the electronic device after both the authorized user and the at least one other person are identified unless the authorized user has elected user settings within the electronic device causing the electronic device to always be unlocked.

3. The method of claim 1, further comprising changing a content delivery application for the content from a first content delivery application to a second content delivery application upon detecting the at least one other person entering an environment of the electronic device.

4. The method of claim 1, the one or more further determining whether the authorized user and the at least one other person are both looking at the electronic device by detecting both a gaze cone and also if an eye of the authorized user or the at least one other person is looking in a predefined direction.

5. The method of claim 1, further comprising removing the content from the display when another person identified as a child enters the environment of the electronic device and replacing the content with other content that is educational in nature.

6. The method of claim 1, further comprising authenticating, with an authentication system of the electronic device, the authorized user of the electronic device from a device command requesting the one or more processors to access an authentication system and initiate an authentication process using microphones that beam steer audio reception toward the authorized user and omitting, when one or more user settings prevent locking of the electronic device, authentication of the at least one other person.

7. The method of claim 1, wherein the content comprises prior communications between the authorized user and the at least one other person, wherein presentation of the prior communications occurs in a forefront with grouping and highlighting.

8. The method of claim 1, wherein the presenting of the content previously partially consumed by the authorized user and the at least one other person occurs concurrently with another presentation of other content, further comprising highlighting the content previously when a presentation date is a recurring date and a presentation location matches a recurring event occurring at the presentation location during a predefined event.

9. The method of claim 8, wherein the predefined event comprises a marriage anniversary.

10. The method of claim 8, the predefined event comprising a vacation and the content comprising common content collected together by the authorized user and the at least one at a vacation destination identified as the presentation location.

11. The method of claim 1, the content comprising a grocery list, further comprising receiving, at a user interface of the electronic device, one or more edits to the content previously partially consumed by the authorized user and the at least one other person, the edits comprising a deletion of at least one grocery list item and an addition of at least one other grocery list item, and transmitting, with a wireless communication circuit of the electronic device, a visible representation the one or more edits on the grocery list to a remote electronic device belonging to the at least one other person.

12. The method of claim 1, further comprising continuing the presenting the content in response to detecting the at least one other person leaving an environment of the electronic device while the authorized user remains in the environment of the electronic device and ceasing the presenting the content on the display of the electronic device in response to detecting the authorized user leaving the environment of the electronic device.

13. The method of claim 1, wherein the presenting the content on the display of the electronic device comprises identifying one or more applications as a function of activity primarily by the authorized user and identifying one or more other applications as another function of activity primarily by the at least one other person.

14. The method of claim 1, further comprising:
    identifying, with the one or more sensors of the electronic device, at least a third person entering the environment of the electronic device as being a child;
    selecting, with one or more processors of the electronic device, another content previously partially consumed by the authorized user, the at least one other person, and the at least a third person; and terminating presentation of the content on the display of the electronic device in response to detecting the at least a third person entering the environment of the electronic device is a child and that the content is dramatic content and, instead, presenting, with the one or more processors, the another content that is educational on the display of the electronic device in response to detecting the at least a third person entering the environment of the electronic device is a child and the content is dramatic content.

15. The method of claim 1, further comprising:

determining, with the one or more processors, prior to the presenting, whether morphing a home screen visible on the display of the electronic device is allowed; and where the morphing the home screen visible on the display of the electronic device is allowed, morphing the home screen visible on the display of the electronic device by presenting, with the one or more processors, the content on the display of the electronic device in response to detecting that the authorized user and the at least one other person are both looking at the electronic device; and otherwise, presenting a new folder with shortcuts to applications commonly used by both the authorized user and the at least one other person on the home screen visible on the display of the electronic device.

* * * * *